US012761239B2

(12) United States Patent
Hiller et al.

(10) Patent No.: US 12,761,239 B2
(45) Date of Patent: Oct. 13, 2026

(54) AIRCRAFT LASER SYSTEM WITH A CORRECTIVE OPTICAL DEVICE

(71) Applicant: The Boeing Company, Chicago, IL (US)

(72) Inventors: Nathan D. Hiller, Irvine, CA (US); Robert M. Dowgwillo, St. Louis, MO (US); Ishaan Bakhle, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 675 days.

(21) Appl. No.: 18/061,419

(22) Filed: Dec. 2, 2022

(65) Prior Publication Data

US 2024/0183876 A1 Jun. 6, 2024

(51) Int. Cl.

| | |
|---|---|
| ***G01P 5/26*** | (2006.01) |
| ***B64D 47/02*** | (2006.01) |
| ***G01S 7/481*** | (2006.01) |
| ***G01S 7/497*** | (2006.01) |
| ***G02B 27/00*** | (2006.01) |

(52) U.S. Cl.

CPC ................ *G01P 5/26* (2013.01); *B64D 47/02* (2013.01); *G01S 7/481* (2013.01); *G01S 7/4814* (2013.01); *G01S 7/497* (2013.01); *G02B 27/0068* (2013.01)

(58) Field of Classification Search

CPC ........... G01P 5/26; B64D 44/02; B64D 47/02; G01S 7/4814; G01S 7/4816; G01S 7/481; G01S 7/497; G01S 17/88; G02B 27/0068

See application file for complete search history.

(56) References Cited

U.S. PATENT DOCUMENTS

| | | | | |
|---|---|---|---|---|
| 5,172,181 A | | 12/1992 | Morbieu et al. | |
| 6,285,288 B1 * | | 9/2001 | Langdon .................. | G01P 5/26 356/28.5 |
| 8,731,884 B2 * | | 5/2014 | Jones ..................... | G02B 26/06 703/6 |

(Continued)

FOREIGN PATENT DOCUMENTS

| | | |
|---|---|---|
| EP | 0947834 A2 | 10/1999 |
| EP | 2422225 A2 | 2/2012 |

(Continued)

OTHER PUBLICATIONS

European Patent Office Extended Search Report, dated Jan. 24, 2024, regarding Application No. EP23199429.4, 9 pages.

*Primary Examiner* — Jennifer D Bennett

(74) *Attorney, Agent, or Firm* — Yee & Associates, P.C.

(57) ABSTRACT

A laser sensor system comprising a laser beam generator, a corrective optical device, an interference system, a detection system, and an analyzer. The laser beam generator is configured to emit a laser beam on a path from an aircraft. The corrective optical device is positioned in the path of the laser beam. The corrective optical device reduces distortion from the laser beam from passing through a turbulent air. The interference system is configured to interfere a backscatter light with a reference light to form an interfered light having a power in response to receiving the backscatter light. The detection system is configured to measure a set of characteristics for the interfered light. The analyzer is configured to determine a set of parameters for the aircraft using the set of characteristics.

17 Claims, 16 Drawing Sheets

(56) References Cited

U.S. PATENT DOCUMENTS

| | | | | |
|---|---|---|---|---|
| 2007/0171397 | A1 | 7/2007 | Halldorsson et al. | |
| 2011/0141470 | A1* | 6/2011 | Renard | G01P 5/26 356/342 |
| 2015/0301178 | A1 | 10/2015 | Brinkmeyer et al. | |
| 2016/0202283 | A1* | 7/2016 | Wang | G01S 7/4814 356/28 |
| 2016/0266244 | A1* | 9/2016 | Holmes | G01S 17/66 |
| 2020/0041886 | A1* | 2/2020 | You | G02B 27/42 |
| 2021/0063429 | A1 | 3/2021 | Tucker et al. | |
| 2021/0318589 | A1* | 10/2021 | Van Heugten | G02C 7/083 |
| 2022/0057519 | A1* | 2/2022 | Goldstein | G01S 17/88 |

FOREIGN PATENT DOCUMENTS

| | | | |
|---|---|---|---|
| JP | 2010133861 | A * | 6/2010 |
| WO | 2016111861 | A1 | 7/2016 |

* cited by examiner

AIRCRAFT LASER SYSTEM WITH A CORRECTIVE OPTICAL DEVICE

BACKGROUND INFORMATION

1. Field

The present disclosure relates generally to sensors and in particular, to an aircraft laser system with a corrective optical device for turbulent air.

2. Background

A sensor such as a pitot tube is used to detect the speed of an aircraft. This type of sensor protrudes from the surface of aircraft to place the pitot tube into the airflow. This protrusion makes this type of sensor susceptible to environmental conditions. For example, unintended impacts, such as bird or insect strikes, can occur on a pitot tube. Other environmental issues include ice formation on the pitot tube.

Another type of sensor used for detecting speed is a light detection and ranging (LIDAR) sensor. With a LIDAR sensor, a laser beam is transmitted into the air and backscatter light generated in response to the laser beam is detected. Various parameters of an aircraft can be determined using a LIDAR sensor. For example, the speed of the aircraft can be determined by comparing the frequency of the laser beam to the frequency in the backscatter. This shift in frequency can be used to calculate the speed of the aircraft.

SUMMARY

An embodiment of the present disclosure provides a laser sensor system comprising a laser beam generator, a corrective optical device, an interference system, a detection system, and an analyzer. The laser beam generator is configured to emit a laser beam on a path from an aircraft. The corrective optical device is positioned in the path of the laser beam. The corrective optical device reduces distortion from the laser beam passing through a turbulent air. The interference system is configured to interfere a backscatter light with a reference light to form an interfered light having a power in response to receiving the backscatter light. The detection system is configured to measure a set of characteristics for the interfered light. The analyzer is configured to determine a set of parameters for the aircraft using the set of characteristics.

Another embodiment of the present disclosure provides a corrective lens comprising a material and sections of the material in the corrective lens. The material changes an optical path length of a laser beam based on a thickness of the material. The sections of the material in the corrective lens have thicknesses selected to compensate for changes in the optical path length of the laser beam in response to the laser beam passing through turbulent air and the sections.

Still another embodiment of the present disclosure provides a method for determining a set of parameters for an aircraft. A laser beam is emitted on a path from the aircraft. The laser beam is directed through a corrective optical device positioned in the path of the laser beam. The corrective optical device reduces distortion from the laser beam from passing through a turbulent air. A backscatter light is interfered with a reference light to form an interfered light in response to receiving the backscatter light. A set of characteristics for the interfered light is measured. The set of parameters is determined for the aircraft using the set of characteristics.

Yet another embodiment of the present disclosure provides a method for correcting distortions in a laser beam. Optical path length changes to portions a laser beam caused by a turbulent air across a path of the laser beam are determined. A corrective lens design is generated that corrects for optical path length changes to the portions of the laser beam such that the optical path length changes to the portions of the laser beam are reduced. A corrective lens is manufactured using the corrective lens design.

Still another embodiment of the present closure provides an aerodynamic measurement system comprising a laser beam generator, an interference system, a detection system, an efficiency analyzer. The laser beam generator is configured to emit a laser beam on a path relative to a surface of an aircraft. The interference system is configured to interfere a backscatter light with a reference light to form an interfered light in response to receiving the backscatter light. The detection system is configured to measure a set of characteristics for the interfered light. The efficiency analyzer is configured to determine an aerodynamic efficiency for the aircraft using the set of characteristics measured for the interfered light.

Another embodiment of the present disclosure provides a method for determining an aerodynamic efficiency for an aircraft. A laser beam is emitted on a path relative to a surface of the aircraft. The backscatter light received in response emitting the laser beam is interfered with a reference beam to generate an interfered light. The power of interfered light is measured. The aerodynamic efficiency is determined for the aircraft using the power measured for the interfered light.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that under normal or optimal operating conditions, a laser beam such a light detection and ranging (LIDAR) beam is not distorted when emitted from the aircraft under desired conditions to detect speed of the aircraft.

Under non-ideal conditions such as those with turbulence, a laser beam passing through turbulent air becomes distorted. This distortion reduces the accuracy or makes determining the speed of an aircraft impossible. The turbulence is in the airflow over the surface of aircraft. This airflow is also referred to as turbulent air.

Turbulent air can occur, for example, on a leading edge of wing of an aircraft during different maneuvers or speeds. For example, when aircraft moves faster than the speed of sound, the amount of turbulent air can make detecting the parameters for aircraft difficult or impossible when the laser beam is emitted through the turbulent air and encounters eddy currents and bow shock waves flowing over surface of aircraft from the leading edge of the wing.

The illustrative embodiments provide a method, apparatus, and system for determining parameters for an aircraft using a laser sensor system that corrects for turbulent air. In one illustrative example, a laser sensor system comprises a laser beam generator, a corrective optical device, an interference system, a detection system, and an analyzer. The laser beam generator is configured to emit a laser beam on a path from an aircraft. The corrective optical device is positioned in the path of the laser beam. The corrective optical device reduces distortion from the laser beam from passing through a turbulent air. The interference system is configured to interfere a backscatter light with a reference light to form an interfered light having a power in response to receiving the backscatter light. The detection system is configured to measure a set of characteristics for the interfered light. The analyzer is configured to determine a set of parameters for the aircraft using the set of characteristics.

Figure 1:
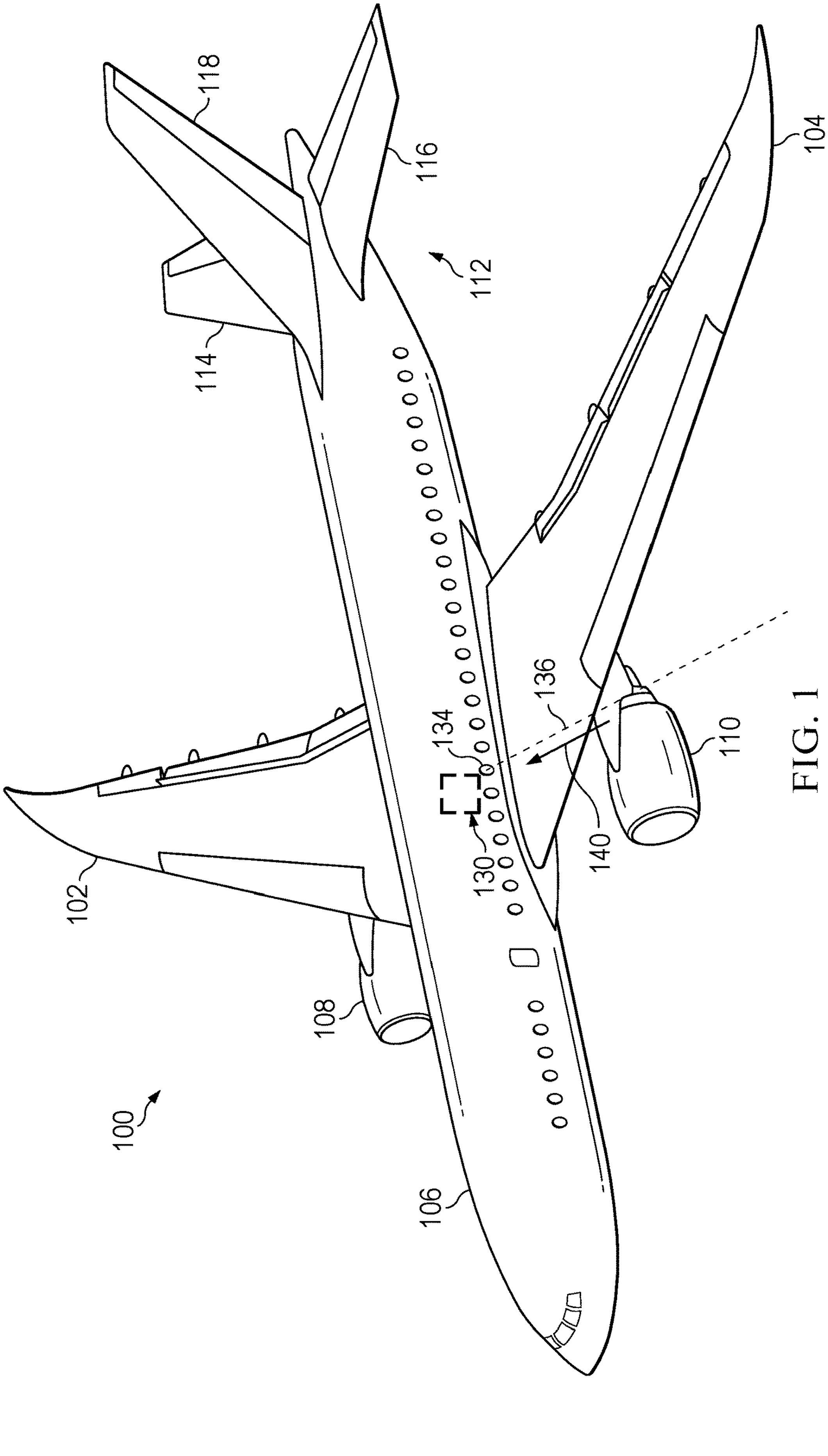
FIG. 1 is an illustration of an aircraft is depicted in accordance with an illustrative embodiment.

With reference now to the figures, and in particular, with reference to FIG. 1, an illustration of an aircraft is depicted in accordance with an illustrative embodiment. In this illustrative example, commercial airplane 100 has wing 102 and wing 104 attached to body 106. Commercial airplane 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Commercial airplane 100 is an example of an aircraft in which speed detection system 130 is an example of the type of laser sensor system that can be implemented in accordance with an illustrative embodiment. In this illustrative example, speed detection system 130 can operate to emit laser beams from window 134 during flight or other movement of commercial airplane 100. Speed detection system 130 can detect backscatter light 140 generated in response to emitting these laser beams.

In this depicted example, speed detection system 130 emits laser beam 136 from window 134 in different directions. Backscatter light 140 is generated in response to emitting laser beam 136. In this example, backscatter light 140 is detected by speed detection system 130. In this depicted example, backscatter light 140 is used to determine the speed of commercial airplane 100.

In this example, speed detection system 130 interferes backscatter light 140 with a reference light. The reference light is derived from laser beam 136. This interference of backscatter light 140 with the reference light results in an interfered light having a beat frequency. The beat frequency for the interfered light is used by speed detection system 130 to determine the speed of commercial airplane 100.

Turbulence in which turbulent air is present can disrupt laser beam 136. In this example, turbulent air can be a condition in the speed of the air at a point that is continuously undergoing changes in magnitude and direction. Turbulent air can be a flow of air in which the air undergoes irregular fluctuations or mixing as compared to laminar airflow in which the air moves in smooth paths or layers.

In the depicted example, when laser beam 136 passes through turbulent air, the optical path length for different portions of laser beam 136 can be changed. For example, in a cross-section of laser beam 136, different portions of the laser beam 136 passing through the cross-section can have different optical path lengths because of the turbulent air at the cross-section.

In other words, different portions of laser beam 136 in the cross-section can have different optical path lengths. These different optical path lengths can make it difficult to obtain backscatter light in a manner that provides sufficient information to determine the speed of commercial airplane 100 with a desired level of accuracy for operating commercial airplane 100.

In other illustrative examples other types of laser sensor systems can be used with commercial airplane 100 in addition to or in place of speed detection system 130. For example, other laser sensor systems can be implemented to detect other parameters for commercial airplane 100 such as an angle of sideslip, an angle of attack, or other parameters that can be detected using a laser beam sensor system.

Figure 2:
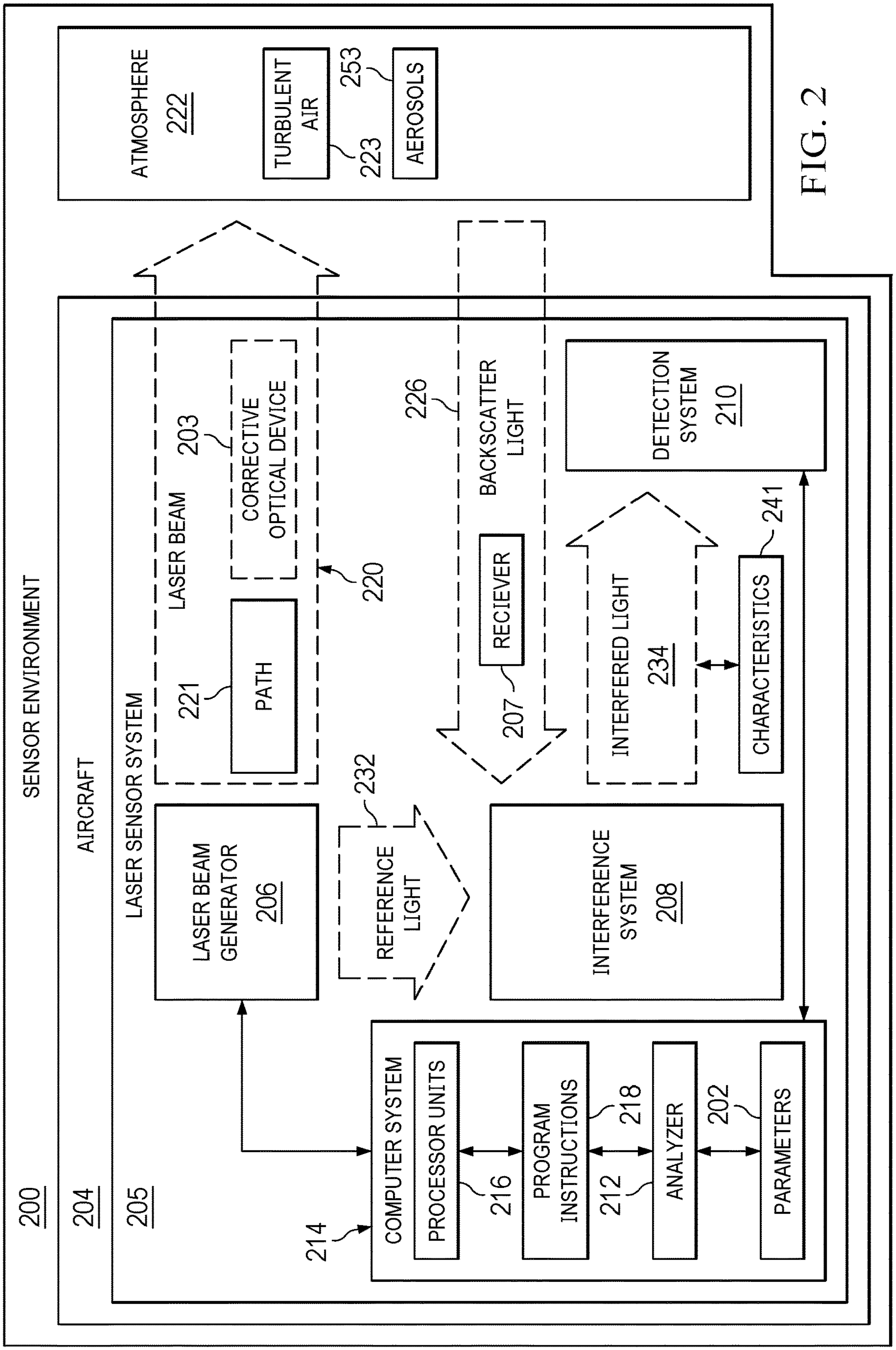
FIG. 2 is a block diagram of a sensor environment in accordance with an illustrative embodiment.

With reference now to FIG. 2, a block diagram of a sensor environment is depicted in accordance with an illustrative embodiment. In this illustrative example, sensor environment 200 is an environment in which a set of parameters 202 for aircraft 204 can be detected using A laser system in the form of laser sensor system 205. As used herein, a "set of" when used with reference items means one or more items. For example, set of parameters 202 is one or more of parameters 202. In this illustrative example, set of parameters 202 can be selected from at least one of a speed, an angle of sideslip, an angle of attack, an aerodynamic efficiency, or other suitable parameters for aircraft 204.

Commercial airplane 100 in FIG. 1 is an example of one implementation for aircraft 204. Aircraft 204 can be selected from a group comprising one of a commercial aircraft, a commercial airplane, a tilt-rotor aircraft, a tilt wing aircraft, a vertical takeoff and landing aircraft, an electrical vertical takeoff and landing aircraft, a personal air aircraft, a military aircraft, a fighter jet, and other types of aircraft.

In this illustrative example, laser sensor system 205 comprises a number of different components. As depicted, laser sensor system 205 comprises laser beam generator 206, receiver 207, corrective optical device 203, interference system 208, detection system 210, and analyzer 212. These components are hardware components that also can include software used in operating the hardware components.

Laser beam generator 206 operates to generate laser beam 220 in laser sensor system 205 and can be a LIDAR system that emits coherent light such as laser beam 220. In this illustrative example, analyzer 212 can control laser beam generator 206 to generate and emit laser beam 220 into atmosphere 222.

In this illustrative example, backscatter light 226 is generated in response to laser beam generator 206 emitting laser beam 220 into atmosphere 222. As depicted, receiver 207 receives backscatter light 226. Receiver 207 is a hardware system and can include optical components that can receive backscatter light 226.

In one illustrative example, receiver 207 can be implemented using a telescope, which contains optical components that can both receive and transmit light. The receiving of backscatter light 226 can also be referred to as detecting backscatter light 226.

In this illustrative example, in this example, turbulent air 223 is caused by aircraft 204 moving through atmosphere 222. Turbulent air 223 caused by aircraft 204 is in contrast to naturally occurring turbulence in atmosphere 222.

In this illustrative example, laser beam 220 passing through turbulent air 223 can result in distortion of laser beam 220 such that backscatter light 226 when interfered with reference light 232 does not provide accurate measurements of a set of characteristics 241 for interfered light 234 for use in determining the set of parameters 202. For example, when speed is a parameter in the set of parameters 202, laser beam 220 passing through turbulent air 223 results in different portions of laser beam 220 having different optical path lengths. These changes in the optical path lengths in different portions of laser beam 220 result in a misalignment of phases between these different portions of laser beam 220. As a result, backscatter light 226 can also have a misalignment of phases that results in an inability to detect a beat frequency for use in determining the speed.

With respect to aerodynamic efficiency, the different optical path lengths caused by turbulent air 223 can also cause a misalignment of phases resulting in an inability to obtain a correct reading of power in interfered light 234, resulting from backscatter light 226 being out of phase.

As another example, measuring aerosols 253 as a parameter in atmosphere 222 around aircraft 204 can also be made more difficult because of distortions in laser beam 220 caused by laser beam 220 traveling through turbulent air 223. Thus, these and other parameters in the set of parameters 202 can be difficult to determine with a desired level of accuracy without corrective optical device 203.

In this example, corrective optical device 203 can be used in laser sensor system 205 to reduce these issues. Corrective optical device 203 has a configuration that corrects for distortion caused by laser beam 220 traveling through turbulent air 223.

As depicted, corrective optical device 203 is a hardware device and can contain one or more elements that can be used to adjust laser beam 220. The positioning of corrective optical device 203 in path 221 of laser beam 220 can reduce distortion of laser beam 220 passing through turbulent air 223. In other words, corrective optical device can proactively adjust laser beam 220 prior to laser beam 220 passing through turbulent air 223 to reduce the effects of turbulent air 223.

In this example, interference system 208 interferes backscatter light 226 with reference light 232 to form interfered light 234. Reference light 232 is derived from laser beam 220.

In this illustrative example, the derivation of a reference light from a laser beam can be performed in a number of different ways. For example, reference light 232 can be coherent light split from first laser beam 220 emitted by laser beam generator 206. In another illustrative example, reference light 232 can be coherent light generated by the components that generate the coherent light for laser beam 220. For example, reference light 232 can be generated using the same oscillator, modulator, and fiber amplifier used to generate laser beam 220.

Detection system 210 is a hardware system that includes components that detect interfered light 234. In addition, detection system 210 can measure a set of characteristics 241 for interfered light 234. The set of characteristics for interfered light 234 can include at least one of a beat frequency, a power, polarization, wavelength, an intensity, or other characteristics of interfered light 234.

In this example, detection system 210 is in communication with analyzer 212 in computer system 214. Detection system 210 can output the set of characteristics 241 to analyzer 212 for analysis. Analyzer 212 can determine a set of parameters 202 for aircraft 204 using the set of characteristics 241 received from detection system 210. The set of parameters 202 can be selected from at least one of a speed, an angle of sideslip, an angle of attack, aerodynamic efficiency, or other suitable parameters for aircraft 204.

In this illustrative example, other types of determinations can also be made in addition to those for aircraft 204. For example, interfered light 234 generated from interfering backscatter light 226 with reference light 232 can be used to determine aerosol concentrations in atmosphere 222. For example, the power level in interfered light 234 can be compared with thresholds set for different aerosol concentrations in atmosphere 222 during flight of aircraft 204.

In this illustrative example, analyzer 212 can be implemented in software, hardware, firmware or a combination thereof. When software is used, the operations performed by analyzer 212 can be implemented in program instructions configured to run on hardware, such as a processor unit. When firmware is used, the operations performed by analyzer 212 can be implemented in program instructions and data and stored in persistent memory to run on a processor unit. When hardware is employed, the hardware may include circuits that operate to perform the operations in analyzer 212.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 214 is a physical hardware system and includes one or more data processing systems. When more than one data processing system is present computer system 214, those data processing systems are in communication with each other using a communications medium. The communications medium may be a network. The data processing systems may be selected from at least one of a computer, a server computer, a tablet, or some other suitable data processing system.

As depicted, computer system 214 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond and process instructions and program code that operate a computer. When the number of processor units 216 execute program instructions 218 for a process, the number of processor units 216 can be one or more processor units that are on the same computer or on different computers. In other words, the process can be distributed between processor units 216 on the same or different computers in a computer system 214. Further, the number of processor units 216 can be of the same type or different type of processor units. For example, a number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

Figure 3:
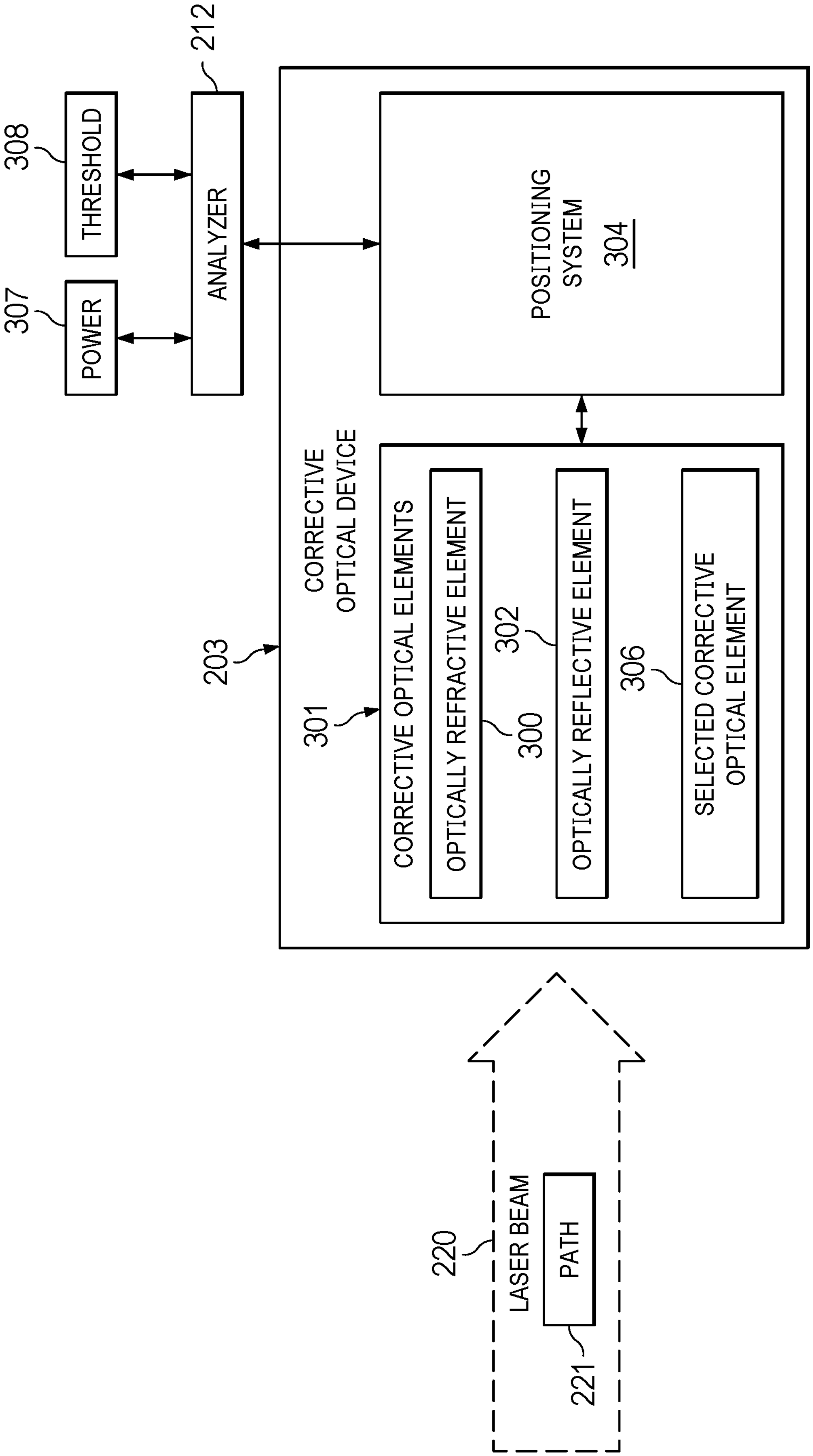
FIG. 3 is an illustration of a block diagram of a corrective optical device in accordance with an illustrative embodiment.

Turning next to FIG. 3, an illustration of a block diagram of a corrective optical device is depicted in accordance with an illustrative embodiment. In the illustrative examples, the same reference numeral may be used in more than one figure. This reuse of a reference numeral in different figures represents the same element in the different figures.

In this illustrative example, an example of elements that can be used in corrective optical device 203 is depicted in accordance with an illustrative embodiment. As depicted, corrective optical device 203 is comprised of a set of corrective optical elements 301. In this illustrative example, the set of corrective optical elements 301 can be selected from at least one of optically refractive element 300 or optically reflective element 302.

In one example, optically refractive element 300 can be a lens. Also in this example, optically reflective element 302 can be one of a mirror, a deformable mirror, and array of micro-mirrors, a micro-electoral mechanical system mirror, and other types of suitable reflective elements.

In this illustrative example, corrective optical device 203 can also include positioning system 304. When used in corrective optical device 203, positioning system 304 is configured to position selected corrective optical element 306 in corrective optical elements 301 in path 221 of laser beam 220.

This illustrative example, positioning system 304 can be controlled by analyzer 212. For example, analyzer 212 can be configured to select selected corrective optical element 306 in corrective optical elements 301 in response to power 307 of interfered light 234 not being greater threshold 308. In this example, power 307 is an example of a characteristic in the set of characteristics 241 that can be measured for interfered light 234.

Analyzer 212 can control positioning system 304 to position selected corrective optical element 306 in path 221 of laser beam 220. In this illustrative example, power 307 for interfered light 234 can be lower than threshold 308 in response to different optical path lengths being present for different portions of laser beam 220.

In another illustrative example, positioning system 304 can be a control system that dynamically controls the properties of optically refractive element 300 or optically reflective element 302 during flight of aircraft 204. For example, optically refractive element 300 can be a lens having refractive properties that can be actively controlled and optically reflective element 302 can be a mirror having reflective properties that can be actively controlled by positioning system 304. The optical path lengths of laser beam 220 can be adjusted based on the prediction for determined turbulent air.

For example, the refractive or reflective properties of these devices can be adjusted to reduce the distortions caused by turbulent air during different flight conditions in which turbulent air may have different patterns causing different distortions to laser beam 220. For example, different corrections can be made based on the speed of the aircraft and how that speed changes the pattern of turbulent air resulting in different distortions to laser beam 220.

These different optical path lengths can result in distortions in laser beam 220 such as in a misalignment in phase. These distortions in laser beam 220 can result a misalignment in phase between different portions of the backscatter light generated in response to laser beam 220. This misalignment can be such that it is difficult or impossible to determine a characteristic in the set of characteristics 241 for interfered light 234 such as beat frequency used to determine speed for aircraft 204. In another example, the different optical path lengths can result in a characteristic such as power in the set of characteristics 241 for interfered light 234 to be too low to obtain a correct reading of power in interfered light 234 for use in determining other characteristics such as, for example, aerodynamic efficiency.

Figure 4:
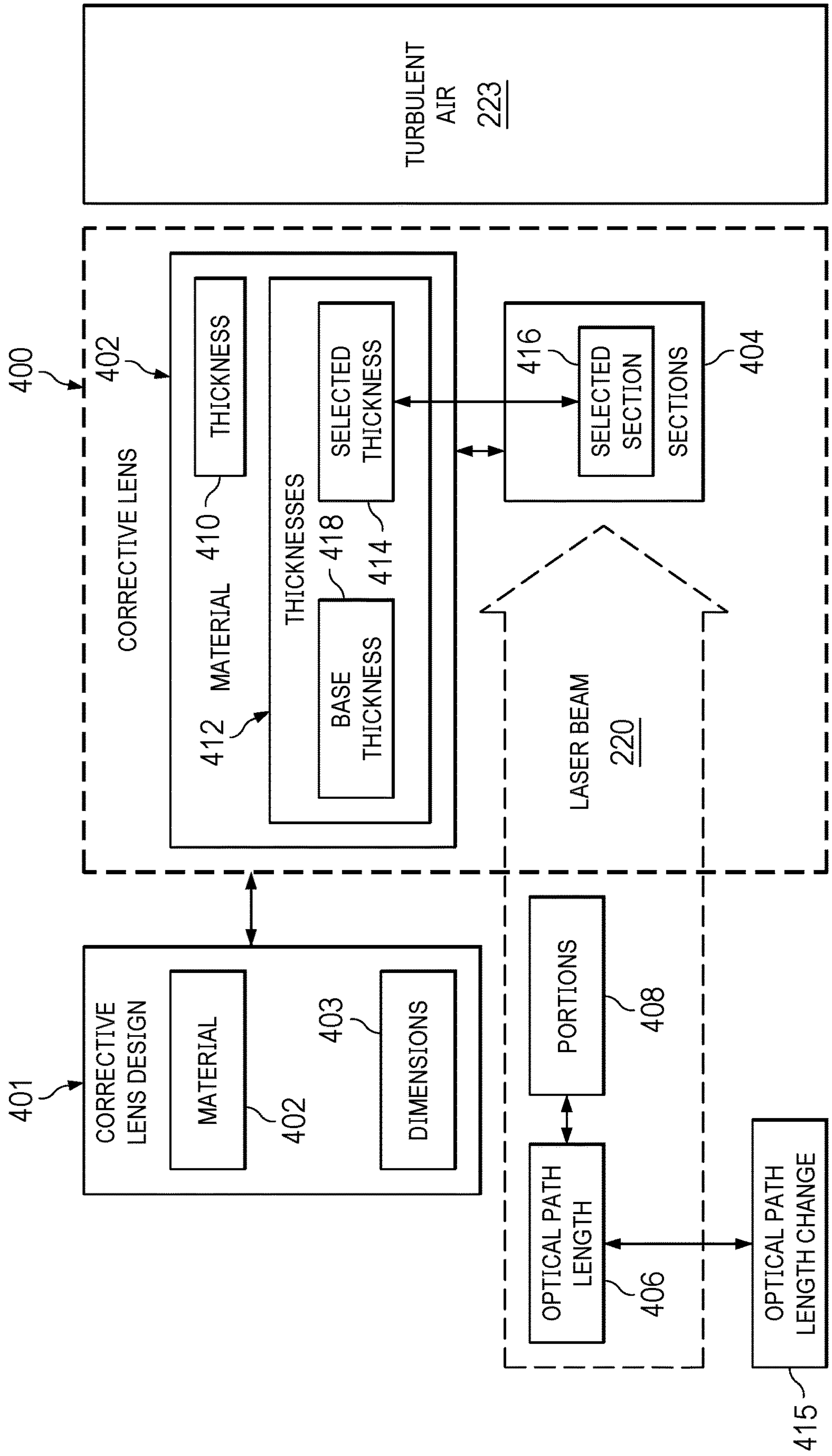
FIG. 4 is an illustration of a block diagram of a lens in accordance with an illustrative embodiment.

Turning to FIG. 4, an illustration of a block diagram of a lens is depicted in accordance with an illustrative embodiment. In this illustrative example, an example implementation of corrective lens 400 manufactured from corrective lens design 401 can be used to implement optically refractive element 300 is depicted.

In this illustrative example, corrective lens design 401 for corrective lens 400 is comprised of a number of different components. As depicted, corrective lens 400 includes material 402 and sections 404.

In this example, material 402 is a material that changes optical path length 406 of laser beam 220 based on thickness 410 of material 402 in corrective lens 400. Material 402 can be a transparent material. Further, this transparent material can be an electro-optic material.

In corrective lens design 401, material 402 in sections 404 in corrective lens 400 has thicknesses 412 that can be selected to compensate for changes in the optical path length 406 of laser beam 220 in response to laser beam 220 passing through turbulent air 223 and sections 404. In sections 404 with different thicknesses, optical path length 406 for portions 408 of laser beam 220 corresponding to sections 404 can have different values for optical path length 406. In other words, laser beam 220 can have a cross-section of portions 408 that correspond to sections 404 in corrective lens 400 through which portions 408 laser beam 220 pass.

Thus, thicknesses 412 selected for sections 404 in corrective lens design 401 can be based on optical path length change 415 to optical path length 406. In designing corrective lens 400, when selected thickness 414 in thicknesses 412 for selected section 416 is greater than base thickness 418 in thicknesses 412, optical path length 406 is increased for laser beam 220 passing through selected section 416 as compared to using base thickness 418 for selected section 416. As another example, when selected thickness 414 for selected section 416 is less than base thickness 418, optical path length 406 is decreased for laser beam 220 passing through selected section 416 as compared using base thickness 418 for selected section 416.

In this example, corrective lens design 401 can describe material 402 and dimensions 403 for manufacturing corrective lens 400. Dimensions 403 can include thicknesses, width, circumference, or other dimensions for corrective lens 400.

In this illustrative example, corrective lens design 401 can be used to manufacture corrective lens 400. This corrective lens can be used with a laser sensor system to correct for distortions caused by laser beam 220 passing through turbulent air 223.

The illustration of sensor environment 200 in the different components in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, laser sensor system 205 can be implemented as a specific type of sensor system such as a speed sensor system, an aerodynamic efficiency sensor system, an aerosol detection system, or other suitable type of sensor system. In yet another illustrative example, receiver 207 can be implemented using a telescope, which can also be used to emit laser beam 220. In this type of implementation, corrective optical device 203 can be positioned in front of the telescope such that corrective optical device 203 is path 221 of laser beam 220 being emitted into the atmosphere 222.

Figure 5:
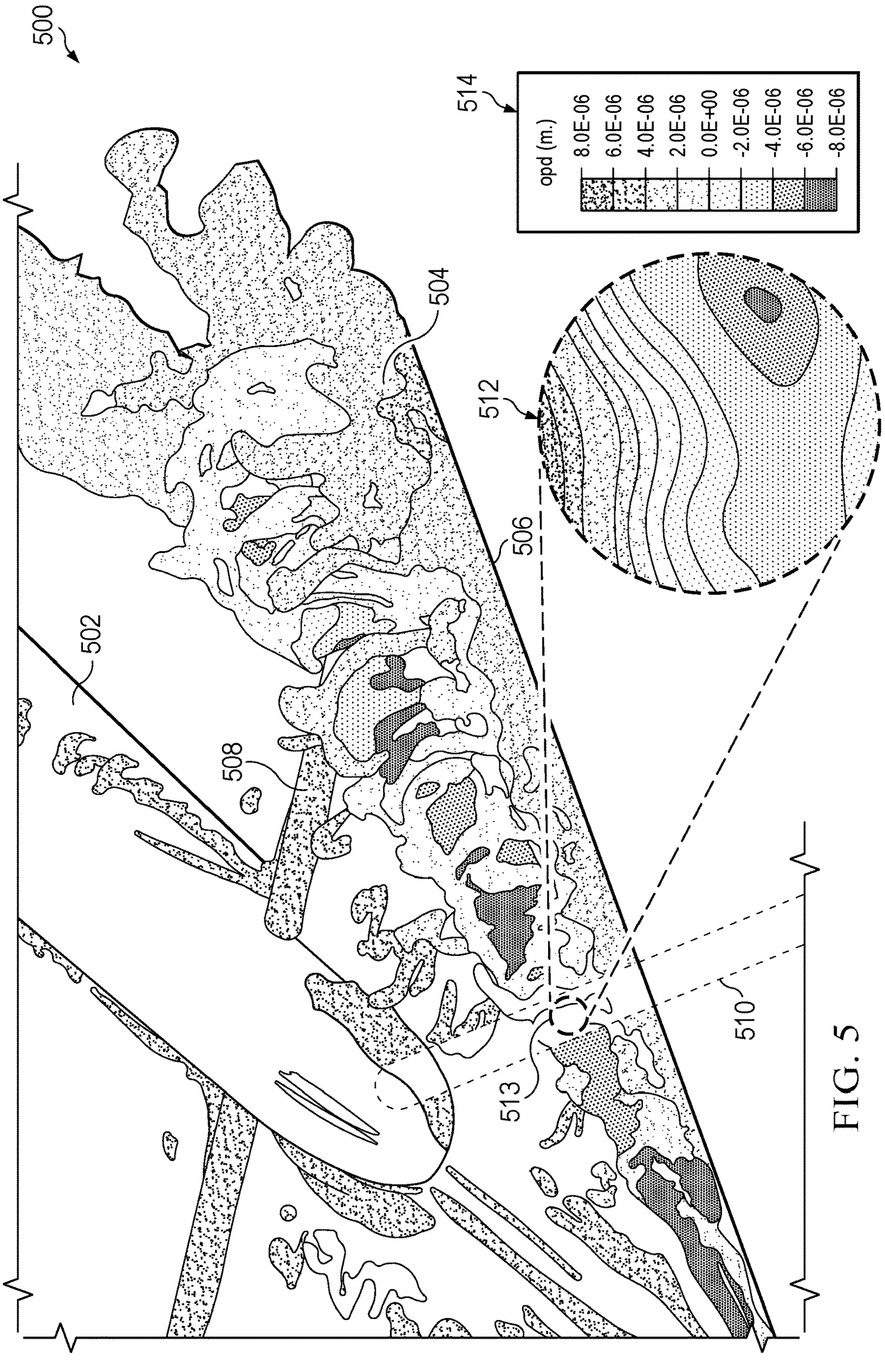
FIG. 5 is a pictorial illustration of airflow over the surface of an aircraft in accordance with an illustrative embodiment.

With reference now to FIG. 5, a pictorial illustration of airflow over the surface of an aircraft is depicted in accordance with an illustrative embodiment. In this illustrative example, airflow 500 is shown over aircraft 502. In this example, airflow 500 includes turbulent air 504 flowing over leading edge 506 of wing 508.

As depicted, turbulent air 504 is caused by wing 508 of aircraft 502. This type of turbulence caused by aircraft 502 has a pattern that is repeatable over time. For example, eddy currents in turbulent air 504 can have a pattern over time that can be identified.

As result, this pattern can be determined and used to design a corrective lens for reducing distortions to laser beam 510 caused by turbulent air 504.

In this example, laser beam 510 is emitted from aircraft 502. Turbulent air 504 is present across the path of laser beam 510. Turbulent air 504 changes the optical path for laser beam 510. The change in the optical path occurs because of changing densities within turbulent air 504. As the density of the air increases in turbulent air 504, the optical path increases in length. As the density decreases, the optical path decreases in length.

For example, area 512 is an enlarged view of cross-section 513 where laser beam 510 propagates through turbulent air 504. As can be seen in area 512, the turbulent air in airflow 500 has different densities identified by legend 514. As a result, different portions of laser beam 510 will have different optical path lengths in response to the change air densities. These different optical path lengths can result in misalignment of phases between these different portions of laser beam 510.

These different optical path lengths are represented as optical path differences in area 512. The optical path differences represent differences in optical path lengths that are present as compared to air without turbulent air 504.

As a result, backscatter light received in response to laser beam 510 can also have a misalignment of phases that results in an inability to obtain accurate measurements when the backscatter is interfered with the reference beam. In other words, when the change in the optical path is not even in different portions of cross-section 513, backscatter light is not received in a manner that enables determining a beat frequency or other characteristics to detect the speed or other parameters for aircraft 522.

In the illustrative examples, a corrective optical device can be used to correct for these changes that turbulent air 504 cause to laser beam 510 passing through turbulent air 504.

Figure 6:
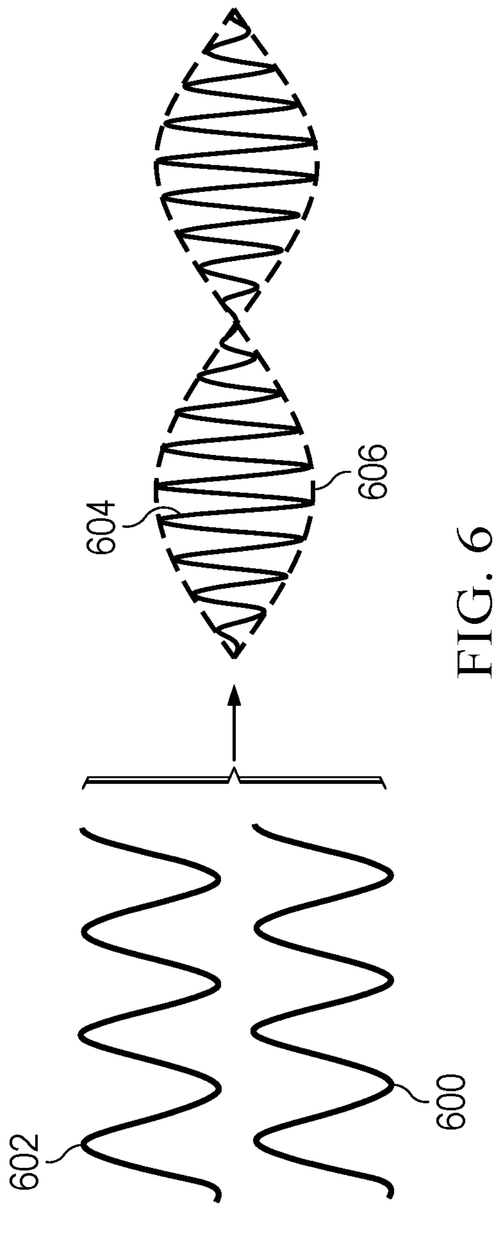
FIG. 6 is an illustration of light used to determine the set of parameters for an aircraft in accordance with an illustrative embodiment.

Turning next to FIG. 6, an illustration of light used to determine the set of parameters for an aircraft is depicted in accordance with an illustrative embodiment. In this illustrative example, backscatter light 600 and reference light 602 are coherent light. In this depicted example, a difference is present between the frequency for backscatter light 600 and reference light 602. This difference in frequency can be such that the interference of the backscatter light 600 and reference light 602 results in a beat frequency.

As depicted in this example, when backscatter light 600 and reference light 602 are interfered or combined with each other, interfered light 604 having beat frequency 606 is generated. The power for interfered light 604 can be measured. The power of interfered light 604 is contributed in part from backscatter light 600 and in part from reference light 602.

When turbulent air is present, the quality of backscatter light 600 received in response to emitting a laser beam through the turbulent air can be sufficiently poor that interfering backscatter light 600 with reference light 602 does not contain interfered light 604 with beat frequency 606 that can be detected or detected with a desired level. In this example, beat frequency 606 is one characteristic in a set of characteristics that can be measured in interfered light 604. Similar issues can occur in measuring these other characteristics in response to the presence of turbulent air when emitting a laser beam to obtain backscatter light 600.

Figure 7:
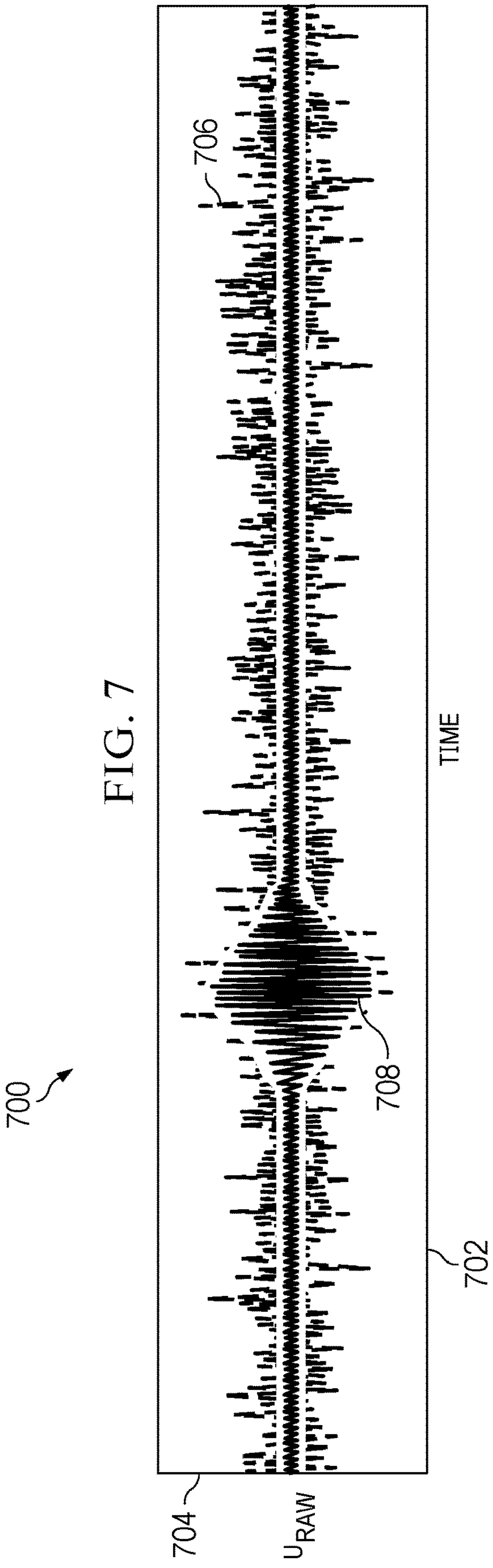
FIG. 7 is an illustration of an interfered light in a power versus time graph in accordance with an illustrative embodiment.

With reference to FIG. 7, an illustration of an interfered light in a power versus time graph is depicted in accordance with an illustrative embodiment. As depicted, graph 700 is a graph of power versus time with X-axis 702 being time and Y-axis 704 being power.

In this depicted example line 706 represents the power measured by detector that includes the power for the interfered light and noise. The power of the interfered light is an indirect measurement of the power in the backscatter light received in response to a laser beam. The measurement of power can be used to determine a set of parameters for an aircraft such as, for example, the set of parameters 202 in FIG. 2. These power measurements can be used to determine parameters such as, for example, aerodynamic efficiency, aerosols, and other parameters.

As depicted, line 708 represents the power for just the interfered light. The power for the interfered light in line 708 may not be easily distinguishable from the noise in line 706 in the measurements made by the detector in a laser sensor system.

The power versus time curve shows power generated by many different frequencies that are not distinguishable in the power versus time curve. With this situation, the power versus time curve can be transformed into a power versus frequency curve using a Fast Fourier transform (FFT). In this manner, the power for a particular frequency such as the frequency of the interfered light can be more easily identified using a power versus frequency curve instead of a power versus time curve.

Figure 8:
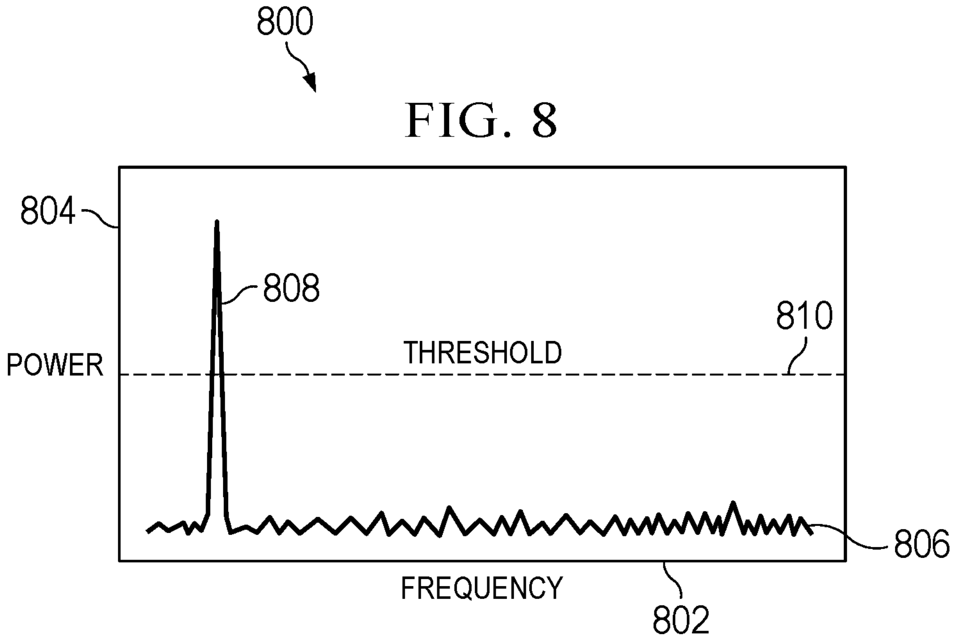
FIG. 8 is an illustration of a graph of an interfered light in a power versus frequency graph in accordance with an illustrative embodiment.

In FIG. 8, an illustration of a graph of an interfered light in a power versus frequency graph is depicted in accordance with an illustrative embodiment. As depicted, graph 800 is a graph of power versus frequency with X-axis 802 being frequency and Y-axis 804 being power.

In this example, line 806 represents power for an interfered light and noise. Line 806 can be generated by performing a Fast Fourier transform (FFT) on a power versus time curve measured for the interfered light, such as line 706 in graph 700 in FIG. 7.

As discussed in FIG. 7, line 706 represents measurements made by detector that includes the power for the interfered light and can also include power for noise. The power versus time curve shows power generated by many different frequencies that are not distinguishable in the power versus time curve. By performing a Fast Fourier Transform, the power for different frequencies is seen in line 806. This line can include the beat frequency and noise.

In this example, peak 808 is a candidate for a frequency that can be the beat frequency in the interfered light. Whether peak 808 is considered to be the frequency of the beat frequency can be determined by comparing the power of peak 808 to threshold 810. In this manner, the power for the interference light can be identified from noise and measured.

In this example, peak 808 is greater than threshold 810. As a result, the frequency of peak 808 is considered the beat frequency for the interfered light. With peak 808 being greater than threshold 810, the beat frequency can be used to determine a parameter such as the speed of the aircraft with a desired level of accuracy.

Additionally, the power in peak 808 can also be used to determine other parameters such as, for example, aerodynamic efficiency, aerosols, and other parameters. For example, with aerodynamic efficiency, threshold 810 can be set for a particular level of aerodynamic efficiency. In other illustrative examples, one or more thresholds in addition to threshold 810 can be used. The additional thresholds can be for different aerodynamic efficiency levels. The threshold that peak 808 exceeds can be used to determine the aerodynamic efficiency for the aircraft.

Figure 9:
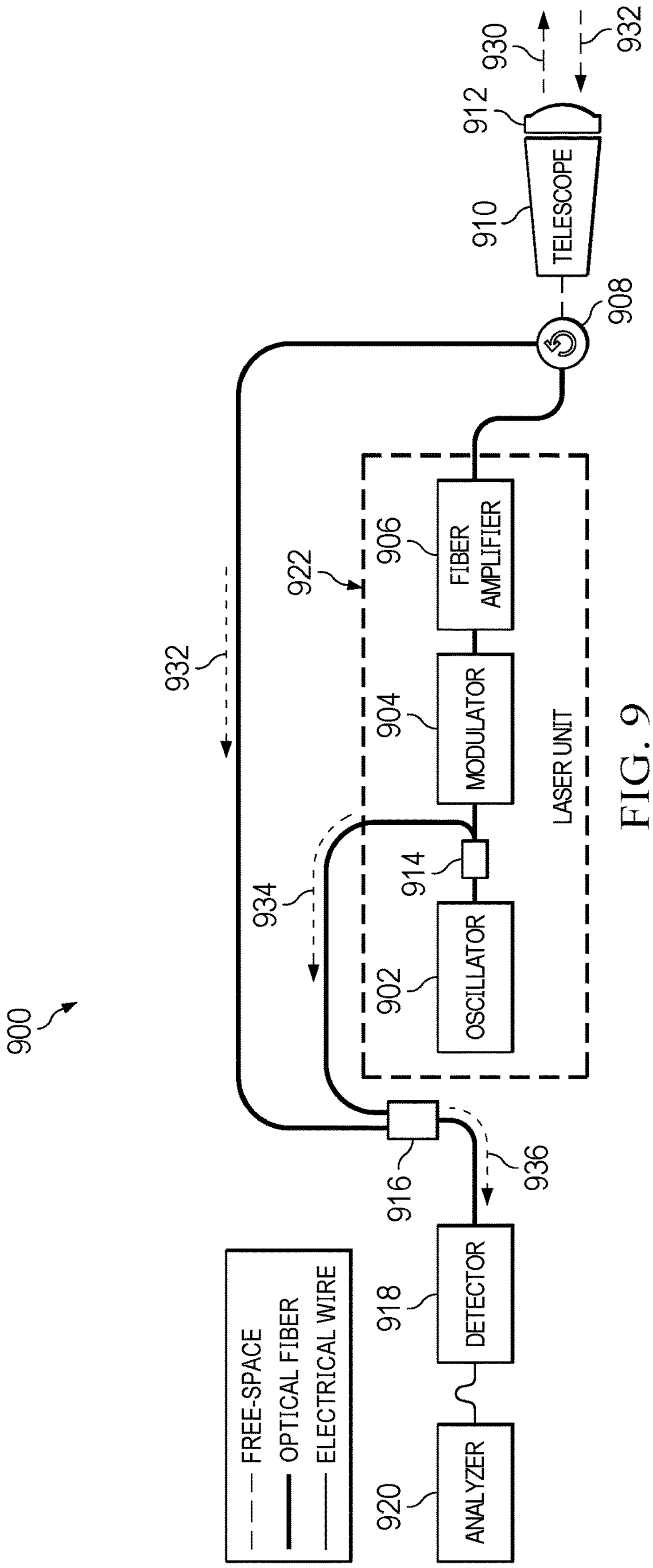
FIG. 9 is an illustration of a laser sensor system in accordance with an illustrative embodiment.

With reference next to FIG. 9, an illustration of a laser sensor system is depicted in accordance with an illustrative embodiment. In this illustrative example, laser sensor system 900 is an example of an implementation for laser sensor system 205 in FIG. 2.

As depicted, laser sensor system 900 comprises a number of different components. As depicted, laser sensor system 900 includes oscillator 902, modulator 904, fiber amplifier 906, circulator 908, telescope 910, corrective lens 912, splitter 914, interference coupler 916, detector 918, and analyzer 920. These components are examples of components that can be used to implement laser beam generator 206 in FIG. 2.

In this depicted example, oscillator 902, modulator 904, and fiber amplifier 906 are components for laser unit 922. Laser unit 922 is an example of a component that can be used to implement laser beam generator 206 in FIG. 2.

In this example, the oscillator 902 generates coherent light that is used to emit laser beam 930. Modulator 904 can operate to manipulate one or more properties of the coherent light generated by the oscillators. For example, modulator 904 can change or manipulate the coherent light generated by oscillator 902 to obtain desired property such as intensity, phase, polarization, or other property. In this example, fiber amplifier 906 can operate to amplify or boost the coherent light generated by oscillator 902 and modulated by modulator 904.

As depicted, fiber amplifier 906 is connected to circulator 908. Circulator 908 is hardware optical circulator in the form of a port device such that light entering a port exits on the next port in circulator 908.

In this example, circulator 908 is in communication with telescope 910. This communication can be through a connection using an optical fiber or through free space. Telescope 910 emits laser beam 930 through corrective lens 912. As depicted, corrective lens 912 is positioned in the path of laser beam 930. Corrective lens 912 can be an example of an implementation of corrective lens 400 in FIG. 4. In this example, corrective lens 912 is designed to reduce distortion of laser beam 930 caused by laser beam 930 passing through turbulent air.

In response to the emission or transmission of laser beam 930, backscatter light 932 can be received by telescope 910. Backscatter light 932 is received in response to the transmission of laser beam 930 into the atmosphere. Backscatter light 932 results from the scattering of laser beam 930 by various particles in the atmosphere. In this example, telescope 910 also operates as a receiver, such as receiver 207

FIG. 2. In one illustrative example, telescope 910 can be configured as a monostatic system such that both laser beam 930 passes through corrective lens 912 and backscatter light 932 is received passing corrective lens 912. In another illustrative example, a bistatic system can be used such that laser beam 930 is amended through telescope 910 and received at a different telescope or receiver. In this example, a different corrective lens can be used for the receiver receiving backscatter light 932 to correct for turbulent air at the location of the receiver.

In response to the emission of laser beam 930, backscatter light 932 is received by telescope 910. In this illustrative example, backscatter light 932 received by telescope 910 is sent to circulator 908. In this example, circulator 908 sends backscatter light 932 to interference coupler 916. Interference coupler 916 can be, for example, a 3 DB coupler. In this example, interference coupler 916 interferes backscatter light 932 with reference light 934.

As depicted, reference light 934 is derived from coherent light generated by oscillator 902. In this example, reference light 934 is split from this coherent light using splitter 914 which is connected to interference coupler 916. Interfered light 936 is sent from interference coupler 916 to detector 918.

In this example, detector 918 measures a set of characteristics for interfered light 936. For example, detector 918 can measure at least one of a power, a beat frequency, a phase, or other characteristics of interfered light 936. The measurements of these characteristics are sent to analyzer 920. In response to receiving the set of characteristics measured by detector 918, analyzer 920 can determine a set of parameters for the aircraft.

The illustration of laser sensor system 900 in FIG. 9 is provided as an example of one implementation for laser sensor system 205 in FIG. 2. This illustration is not meant to limit the manner in analyzer 212 in FIG. 2 can be implemented in other illustrative examples. In another example, modulator 904 can be omitted when the laser beam system is a continuous wave LIDAR system. Additionally, optical fibers can be made solid or hollow core fibers. In other examples, the optical fibers can be omitted for a free-space LIDAR system.

Figure 10:
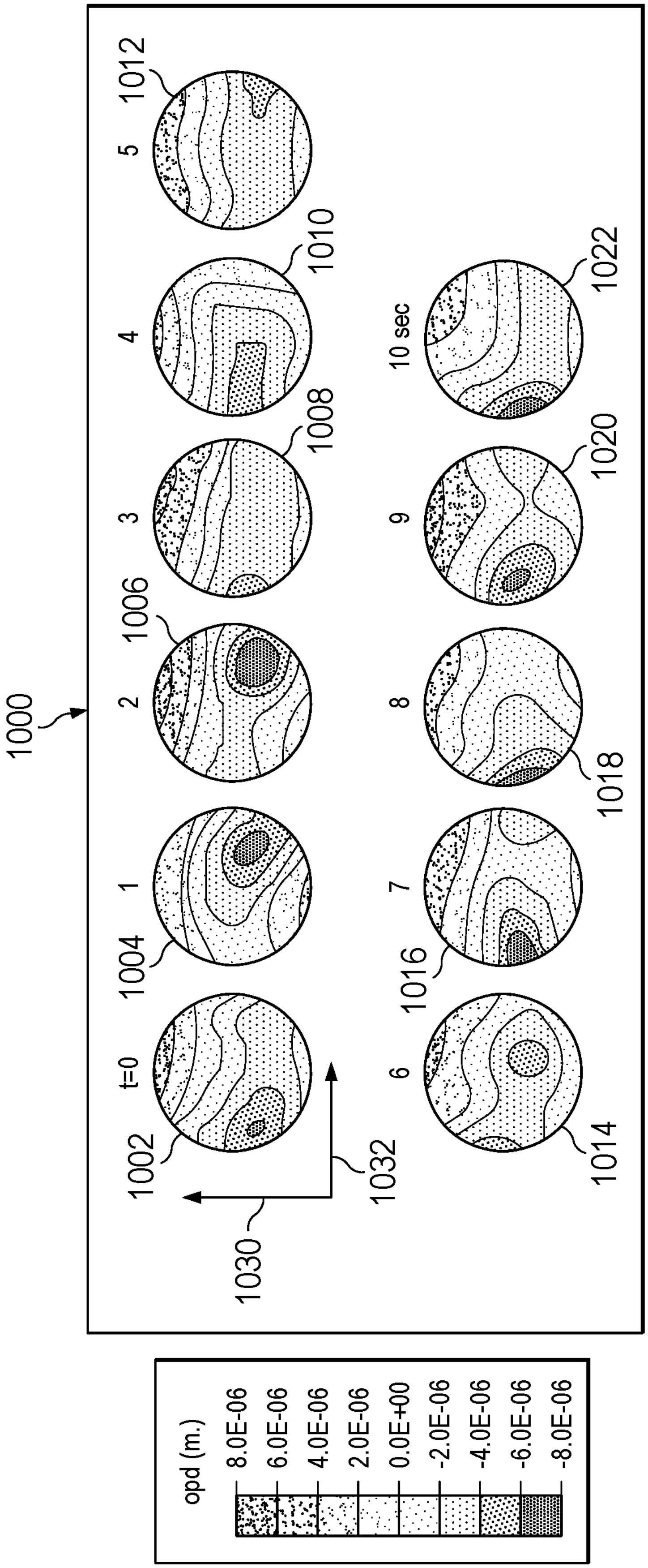
FIG. 10 is an illustration of turbulence across a path of the laser beam in accordance with an illustrative embodiment.

Turning next to FIG. 10, an illustration of turbulence across a path of the laser beam is depicted in accordance with an illustrative embodiment. As depicted, areas 1000 depict optical path differences in a cross-section of a laser beam recurring from air turbulence over time. For example, areas 1000 illustrate optical path differences resulting from air turbulence that occurs across a cross-section such as cross-section 513 for laser beam 510 in FIG. 5.

In this illustrative example, the optical path difference is a difference relative to a base optical path. This base optical path can be the optical path that is present when the laser beam is emitted through the air in which turbulence is not present at that cross-section for which areas 1000 are generated for the same cross-section of the laser beam passing through turbulent air over time.

In this example, a positive optical path difference indicates that the optical path length is increased as compared to non-turbulent air. This increase in optical path length can result from increased air density in the turbulent air as compared to nonturbulent air. A negative optical path difference indicates that the optical path length is decreased as compared to nonturbulent air. This decrease in the optical path length can be a result in the decreased air density in the turbulent air as compared to nonturbulent air.

In this example, optical density differences in areas 1000 current in response to turbulent air across a cross-section of a laser beam over time from time t=0 to time t=10. As depicted, air turbulence over this period of time is shown in area 1002 for t=0, area 1004 for t=1, area 1006 for t=2, area 1008 for t=3, area 1010 for t=4, area 1012 for t=5, area 1014 for t=6, area 1016 for t=7, area 1018 for t=8, area 1020 for t=9, area 1022 for t=10 Each of these areas has optical path differences occurring from air turbulence across a cross-section of the laser beam at a particular period of time for cross-section such as cross-section 513 in FIG. 5.

As depicted in this example, the optical path difference over the same portion or section in area 1010 can change over time. In this example, a pattern can be identified. In other words, a pattern can be present in eddy currents or airflow in the turbulent air. As result, the optical path difference can have a pattern within areas 1000.

In this example, optical path differences are shown for horizontal and vertical positions in areas 1000. As depicted, Y-axis 1030 represents a vertical direction while X-axis 1032 represents a horizontal direction for different portions of the laser beam shown in areas 1000 over time from t=0 to t=10. As depicted in this example, the change in air turbulence is stronger in the vertical direction along Y-axis 1030 as compared to the horizontal direction along X-axis 1032. As a result, the optical path difference has a greater variation in the vertical direction as compared to the horizontal direction.

Although air turbulence is shown for areas 1000 in one second time intervals from t=0 to t=10, the averaging can be performed for even smaller time intervals and can be performed for longer amounts of time. For example, in a 10 second time interval, a simulation of the optical path difference for an area can be measured or simulated for a millisecond, a microsecond, some other period of time rather than one second. As another example, the simulation can be performed for 30 seconds, one minute, three minutes, or some other length of time.

Figure 11:
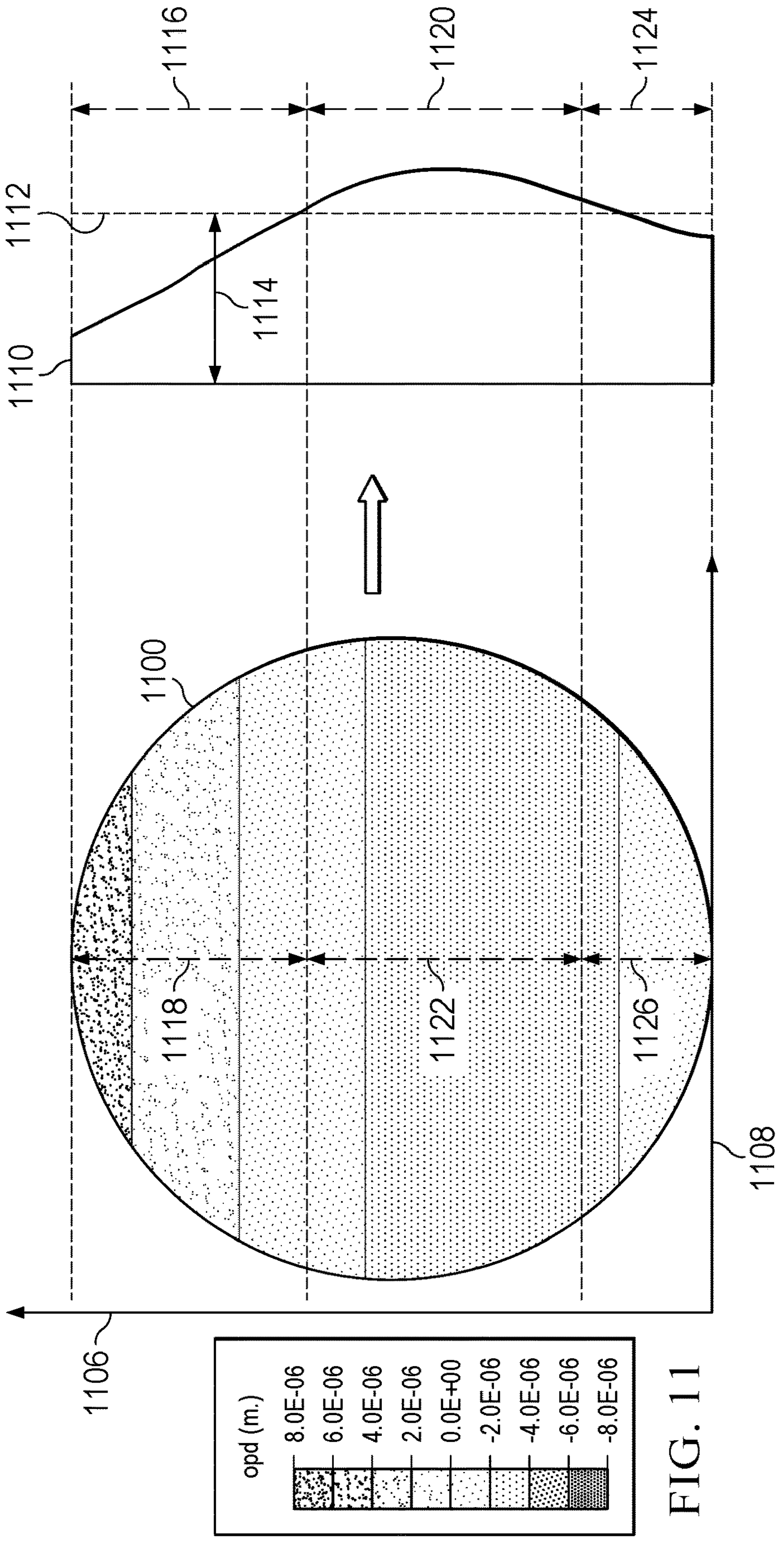
FIG. 11 is an illustration of time averaged optical difference and a corrective lens design based on the time averaged optical difference in accordance with an illustrative embodiment.

Turning to FIG. 11, an illustration of time averaged optical difference and a corrective lens design based on the time averaged optical difference is depicted in accordance with an illustrative embodiment. In this illustrative example, area 1100 depicts a time averaged optical path difference in a cross-section of different portions of a laser beam based on areas 1000 in FIG. 10 for the same cross-section over time.

In this example, Y-axis 1106 represents a vertical direction while X-axis 1108 represents a horizontal direction for different portions of the laser beam shown in area 1100

In this illustrative example, the optical path difference is a difference in optical path relative to a base optical path length. In this example, the base optical path length can be the optical path length for a laser beam traveling through air without turbulence.

As result, if the air density in the turbulent air is the same as air without turbulence, the optical path difference is zero. If the air density is greater in turbulent air than air without turbulence, the optical path difference is positive. If the air density is less in turbulent air than air without turbulence, the optical path difference is negative.

The time averaged optical path differences in area 1100 can then be used to generate a design for corrective lens 1110. In this illustrative example, line 1112 represents thickness 1114 for corrective lens 1110 that is used when the time averaged optical path difference is 0. In other words, this thickness at line 1112 is present in lens when the optical path length is the same as air without turbulence.

As depicted, section 1116 of corrective lens 1110 has a thickness that is less than thickness 1114 of line 1112 because positive optical path difference 1118 is present in area 1100. In this illustrative example, section 1120 of corrective lens 1110 has a thickness that is greater than thickness 1114 of line 1112 because negative optical path difference 1122 is present in area 1100. Further, section 1124 of corrective lens 1110 has a thickness that is less than thickness 1114 of line 1112 because positive optical path difference 1126 is present in area 1100.

As depicted, the differences in thicknesses in section 1116, section 1120, and section 1124 in corrective lens 1110 varies relative to thickness 1114 based on the variance in the optical path differences identified in the corresponding sections in area 1100.

In this illustrative example, the measurements for optical density differences in areas 1000 in FIG. 10 that are averaged to form time averaged optical path differences in area 1100 are generated from measuring a laser beam passing through the turbulent air in one direction. With this type of measurement, corrective lens 1110 can operate to correct for both distortions caused by turbulent air when transmitting a laser beam and to correct for distortions caused by turbulent air when receiving backscatter light. This type of transmitting of a laser beam and receiving backscatter light at the same location can be implemented using a monostatic system having a single telescope.

This simplified example depicted in FIG. 11 in which air densities have changing averages causing optical path differences in the vertical direction and not the horizontal direction is presented for purposes of illustrating how a lens design can be generated for corrective lens 1110 and is not meant to limit the manner in which their densities can be taken into account in designing corrective lens 1110. In other illustrative examples, the changes in air densities for optical path differences may be minor such that those differences do not need to be taken into account. In yet other illustrative examples, corrective lens 1110 can have variations in thickness in two dimensions for both vertical and horizontal distances based on corresponding optical path differences in the cross-section for which the time averaged optical path differences are calculated.

In still other illustrative examples, the time averaged optical path differences in area 1100 can then be used to generate design for other types of optical elements. For example, an optically reflective mirror can be designed and manufactured using the time averaged optical path differences in area 1100.

Figure 12:
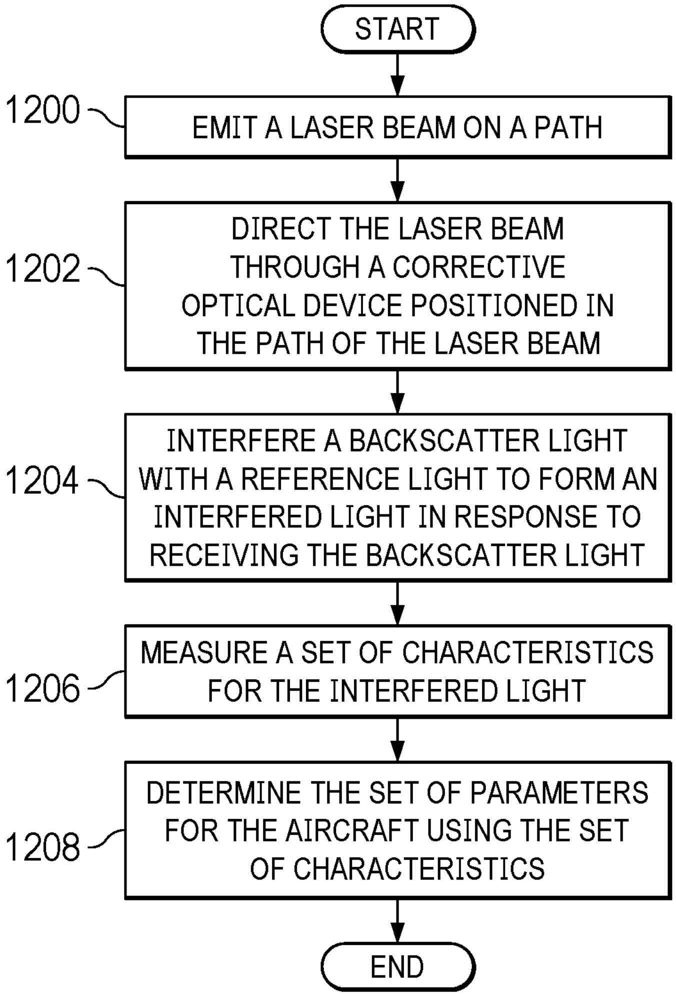
FIG. 12 is an illustration of a flowchart of a process for determining a set of parameters for an aircraft in accordance with an illustrative embodiment.

Turning next to FIG. 12, an illustration of a flowchart of a process for determining a set of parameters for an aircraft is depicted in accordance with an illustrative embodiment. The process in FIG. 12 can be implemented in hardware, software, or both. When implemented in software, the process can take the form of program instructions that is run by one of more processor units located in one or more hardware devices in one or more computer systems. For example, the process can be implemented in laser sensor system 205 in FIG. 2 for use in determining a set of parameters 202 for aircraft 204.

The process begins by emitting a laser beam on a path (operation 1200). The process directs the laser beam through a corrective optical device positioned in the path of the laser beam (operation 1202). In operation 1202, the corrective optical device reduces distortion from the laser beam from passing through turbulent air. For example, the corrective optical device reduces changes in an optical path length for portions of the laser beam caused by the laser beam passing through the turbulent air. As a result, the corrective lens can increase the uniformity of the coherent light in the laser beam when passing through turbulent air.

The process interferes a backscatter light with a reference light to form an interfered light in response to receiving the backscatter light (operation 1204). The process measures a set of characteristics for the interfered light (operation 1206). In operation 1206, the set of characteristics is selected from at least one of a beat frequency, a power, polarization, or wavelength, an intensity, or other characteristic of the interfered light.

The process determines the set of parameters for the aircraft using the set of characteristics (operation 1208). The process terminates thereafter. In operation 1208, the set of parameters can be selected from at least one of a speed, an angle of sideslip, an angle of attack, an aerodynamic efficiency, or other parameter of interest for the aircraft or in the environment around the aircraft.

Figure 13:
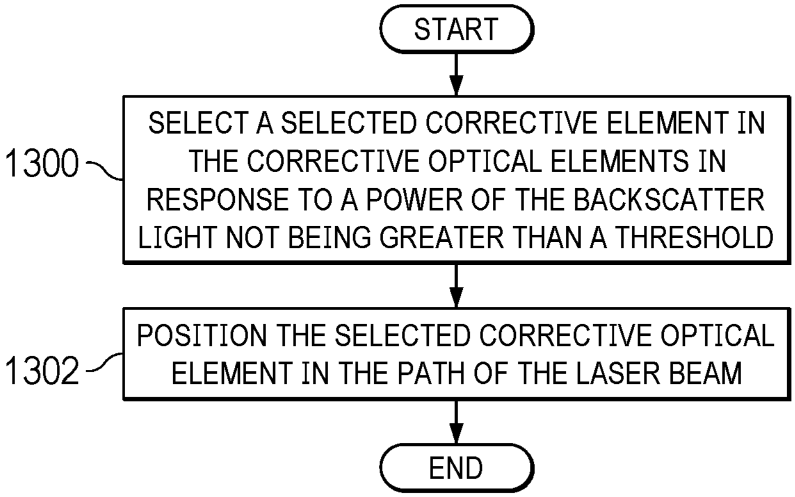
FIG. 13 is an illustration of a flowchart of a process for determining a set of parameters for an aircraft in accordance with an illustrative embodiment.

With reference to FIG. 13, an illustration of a flowchart of a process for determining a set of parameters for an aircraft is depicted in accordance with an illustrative embodiment. The process in FIG. 13 is an example of additional operations that can be performed with the process in FIG. 12. In this example, the corrective optical device comprises corrective optical elements.

The process begins by selecting a selected corrective element in the corrective optical elements in response to a power of the backscatter light not being greater than a threshold (operation 1300). The process positions the selected corrective optical element in the path of the laser beam (operation 1302). The process terminates thereafter.

Figure 14:
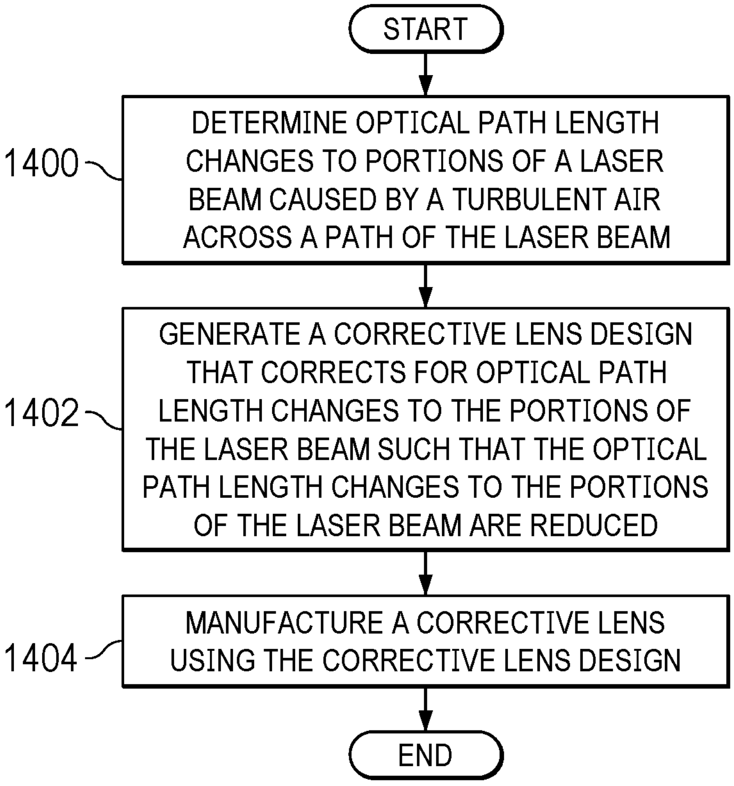
FIG. 14 is an illustration of a flowchart of a process for correcting distortions in a laser beam in accordance with an illustrative embodiment.

Turning to FIG. 14, an illustration of a flowchart of a process for correcting distortions in a laser beam is depicted in accordance with an illustrative embodiment. The process in FIG. 14 can be implemented in hardware, software, or both. When implemented in software, the process can take the form of program instructions that is run by one of more processor units located in one or more hardware devices in one or more computer systems. For example, the process can be implemented in laser sensor system 205 in FIG. 2 for use in determining a set of parameters 202 for aircraft 204.

The process begins determining optical path length changes to portions of a laser beam caused by a turbulent air across a path of the laser beam (operation 1400). In operation 1400, the turbulent air is caused by the movement of the aircraft through the atmosphere. This turbulent air can include, for example, eddy currents. These eddy currents as well as other types of turbulent airflow can have patterns.

These patterns can be identified and used to determine a pattern of optical path length changes that can be averaged over time. The time averaged optical path length changes can be characterized as time averaged optical path differences in a cross-section of different portions of a laser beam for the same cross-section over time.

The process generates a corrective lens design that corrects for optical path length changes to the portions of the laser beam such that the optical path length changes to the portions of the laser beam are reduced (operation 1402). The process manufactures a corrective lens using the corrective lens design (operation 1404). The process terminates thereafter.

When a lens having refractive properties that can be actively controlled or a mirror having reflective properties that can be actively controlled, pattern of time averaged optical path differences can be used to adjust the refractive or reflective properties of these devices to reduce the distortions caused by turbulent air. In other words, these corrective optical elements can be controlled during the flight of aircraft to correct for turbulence. For example, different corrections can be made based on the speed of the aircraft and how that speed the pattern of turbulent air.

Figure 15:
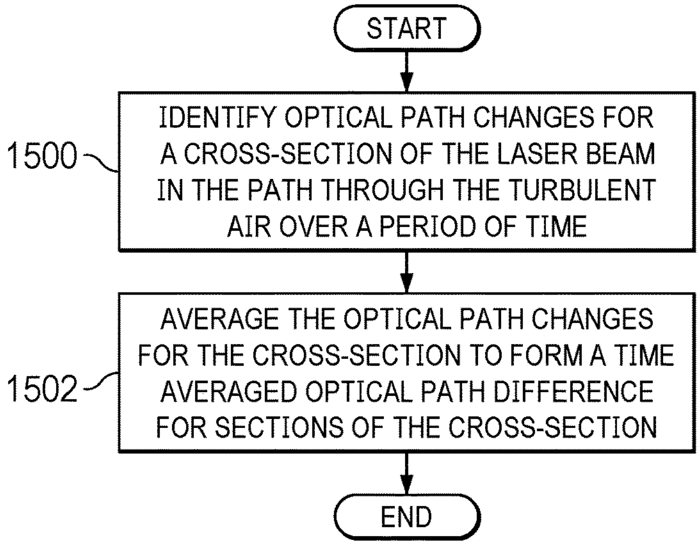
FIG. 15 is an illustration of a flowchart of a process for determining optical path length changes in accordance with an illustrative embodiment.

With reference next to FIG. 15, an illustration of a flowchart of a process for determining optical path length changes is depicted in accordance with an illustrative embodiment. The operations performed in this flowchart can be an example implementation for operation 1400 in FIG. 14. These operations can be used to determine optical path length changes to portions of the laser beam caused by turbulent air across the path of the laser beam.

The process begins by identifying optical path changes for a cross-section of the laser beam in the path through the turbulent air over a period of time (operation 1500). The process averages the optical path changes for the cross-section to form a time averaged optical path difference for sections of the cross-section (operation 1502). The process terminates thereafter.

Figure 16:
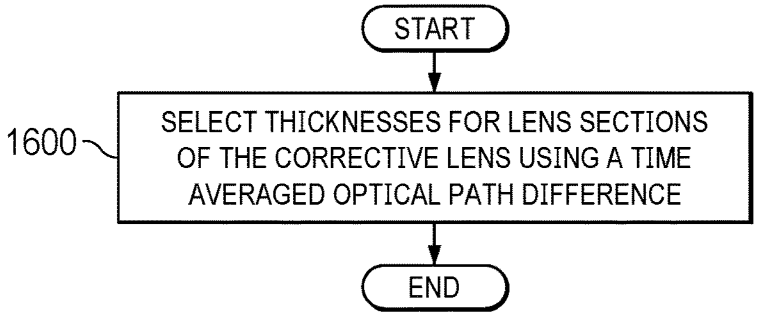
FIG. 16 is an illustration of a flowchart of a process for generating a corrective lens design in accordance with an illustrative embodiment.

Turning now to FIG. 16, an illustration of a flowchart of a process for generating a corrective lens design is depicted in accordance with an illustrative embodiment. The operation illustrated in this flowchart is an example of an implementation for operation 1402 in FIG. 14.

The process selects thicknesses for lens sections of the corrective lens using a time averaged optical path difference (operation 1600). The process terminates thereafter. In operation 1600, changes in the optical path length of the laser beam passing through the lens sections have increased uniformity of the laser beam in response to the laser beam passing through the turbulent air.

Figure 17:
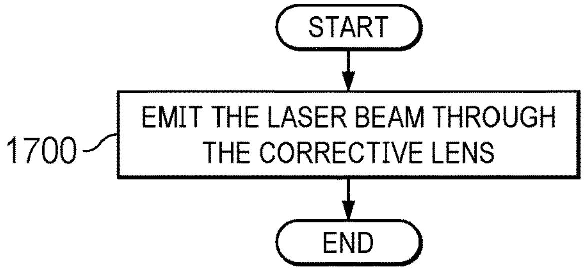
FIG. 17 is an illustration of a flowchart of a process for determining optical path length changes in accordance with an illustrative embodiment.

With reference to FIG. 17, an illustration of a flowchart of a process for determining optical path length changes is depicted in accordance with an illustrative embodiment. The operation performed in this flowchart is an example of an additional operation that can be performed with the operations in FIG. 14.

The process emits the laser beam through the corrective lens (operation 1700). The process terminates thereafter. In operation 1700, the optical path length changes to the portions of the laser beam caused by the turbulent air are reduced by the corrective lens.

Figure 18:
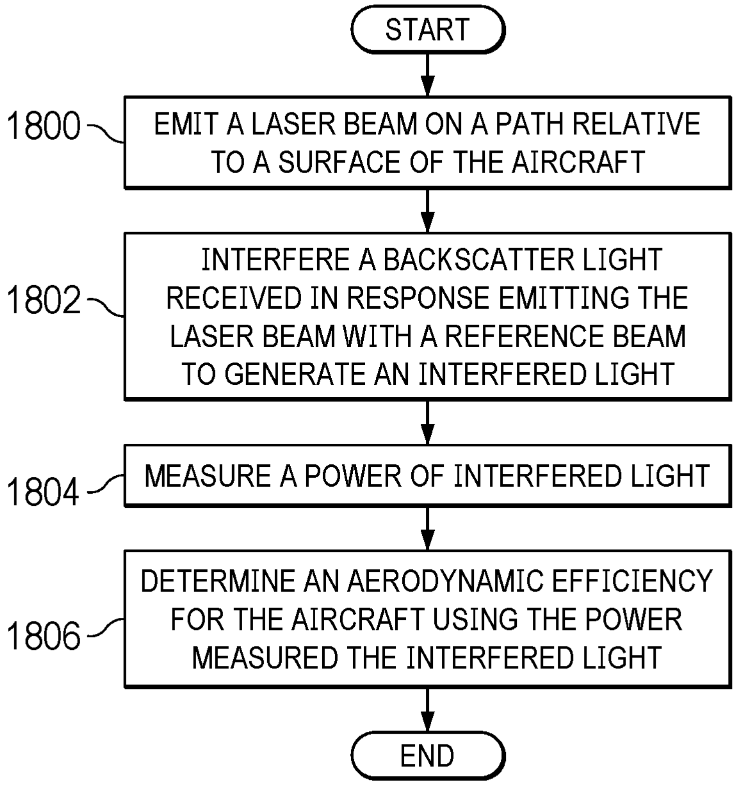
FIG. 18 is an illustration of a flowchart of a process for an aerodynamic efficiency for an aircraft in accordance with an illustrative embodiment.

Turning next to FIG. 18, an illustration of a flowchart of a process for an aerodynamic efficiency for an aircraft is depicted in accordance with an illustrative embodiment. The process in FIG. 18 can be implemented in hardware, software, or both. When implemented in software, the process can take the form of program instructions that is run by one of more processor units located in one or more hardware devices in one or more computer systems. For example, the process can be implemented in laser sensor system 205 in FIG. 2 for use in determining a set of parameters 202 for aircraft 204. In this example, the laser sensor system operates as an aerodynamic efficiency measurement system to determine an aerodynamic efficiency for an aircraft.

The process begins by emitting a laser beam on a path relative to a surface of the aircraft (operation 1800). The process interferes a backscatter light received in response emitting the laser beam with a reference beam to generate an interfered light (operation 1802).

The process measures a power of interfered light (operation 1804). The process determines an aerodynamic efficiency for the aircraft using the power measured for the interfered light (operation 1806). The process terminates thereafter.

Figure 19:
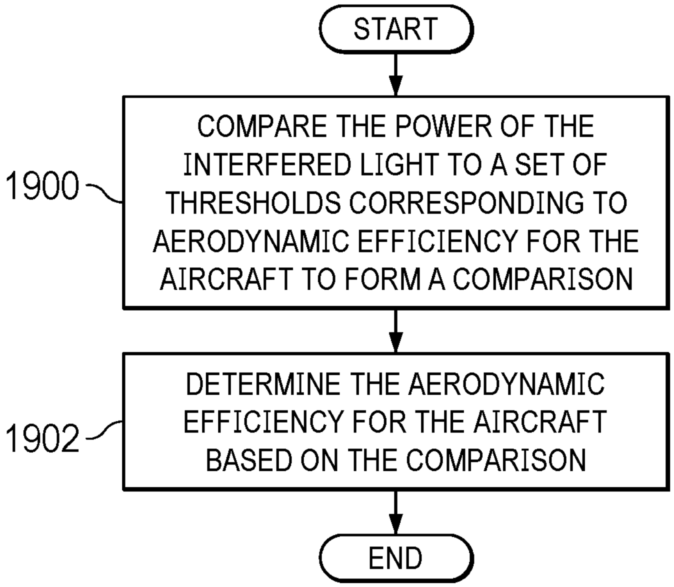
FIG. 19 is an illustration of a flowchart of a process for determining aerodynamic efficiency for an aircraft in accordance with an illustrative embodiment.

In FIG. 19, an illustration of a flowchart of a process for determining aerodynamic efficiency for an aircraft is depicted in accordance with an illustrative embodiment. The process in flowchart is an example of an operation that can be used to implemented operation 1804 in FIG. 18.

The process begins by comparing the power of the interfered light to a set of thresholds corresponding to aerodynamic efficiency for the aircraft to form a comparison (operation 1900). The process determines the aerodynamic efficiency for the aircraft based on the comparison (operation 1902). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 20:
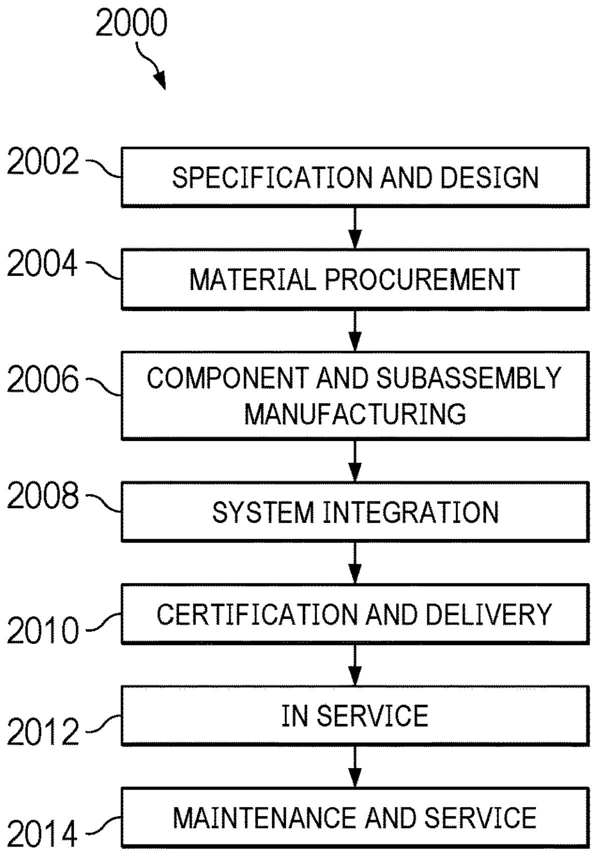
FIG. 20 is an illustration of an aircraft manufacturing and service method in accordance with an illustrative embodiment.
Figure 21:
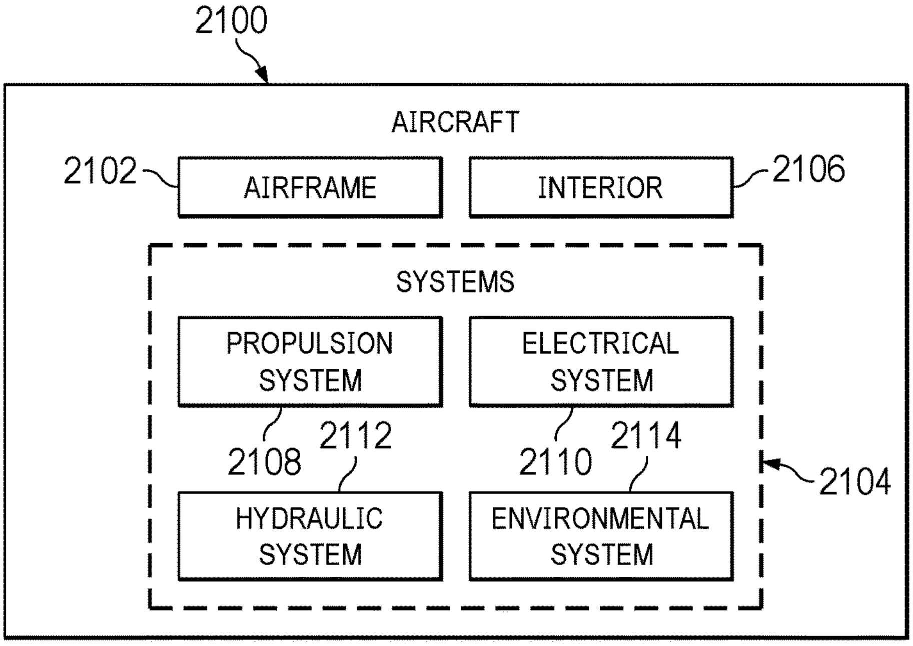
FIG. 21 is an illustration of a block diagram of an aircraft in which an illustrative embodiment may be implemented.

Illustrative embodiments of the disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During pre-production, aircraft manufacturing and service method 2000 may include specification and design 2002 of aircraft 2100 in FIG. 21 and material procurement 2004.

During production, component and subassembly manufacturing 2006 and system integration 2008 of aircraft 2100 in FIG. 21 takes place. Thereafter, aircraft 2100 in FIG. 21 can go through certification and delivery 2010 in order to be placed in service 2012. While in service 2012 by a customer, aircraft 2100 in FIG. 21 is scheduled for routine maintenance and service 2014, which may include modification, reconfiguration, refurbishment, and other maintenance or service.

Each of the processes of aircraft manufacturing and service method 2000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 in FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2000 in FIG. 20.

In one illustrative example, components or subassemblies produced in component and subassembly manufacturing 2006 in FIG. 20 can be fabricated or manufactured in a manner similar to components or subassemblies produced while aircraft 2100 is in service 2012 in FIG. 20. As yet another example, one or more apparatus embodiments, method embodiments, or a combination thereof can be utilized during production stages, such as component and subassembly manufacturing 2006 and system integration 2008 in FIG. 20. One or more apparatus embodiments, method embodiments, or a combination thereof may be utilized while aircraft 2100 is in service 2012, during maintenance and service 2014 in FIG. 20, or both. The use of a number of the different illustrative embodiments may substantially expedite the assembly of aircraft 2100, reduce the cost of aircraft 2100, or both expedite the assembly of aircraft 2100 and reduce the cost of aircraft 2100.

For example, laser sensor system 205 can be implemented in aircraft 2100 during system integration 2008. Corrective optical devices used in laser sensor system 205 can be manufactured during component and subassembly manufacturing 2006. Further, current laser sensor systems can be modified during routine maintenance and service 2014 to include one or more corrective optical devices during maintenance operations that include modification, reconfiguration, refurbishment, or other maintenance and service.

Laser sensor system 205 in FIG. 2 can be used during the operation of aircraft 2100 during in service 2012. The use of laser sensor system 205 during in service 2012 can result in increased accuracy in determining various parameters for aircraft 2100 for the about the environment around aircraft 2100.

Some features of the illustrative examples are described in the following clauses. These clauses are examples of features not intended to limit other illustrative examples.

Clause 1

A laser sensor system comprising:

a laser beam generator configured to emit a laser beam on a path from an aircraft;

a corrective optical device positioned in the path of the laser beam, wherein the corrective optical device reduces distortion from the laser beam from passing through a turbulent air;

an interference system configured to interfere a backscatter light with a reference light to form an interfered light having a power in response to receiving the backscatter light;

a detection system configured to measure a set of characteristics for the interfered light; and an analyzer configured to determine a set of parameters for the aircraft using the set of characteristics.

Clause 2

The laser sensor system according to clause 1, wherein the corrective optical device comprises at least one of an optically refractive element or an optically reflective element.

Clause 3

The laser sensor system according to one of clauses 1 or 2, wherein the optically refractive element is a corrective lens.

Clause 4

The laser sensor system according to clause 3, wherein the corrective lens is comprised of a transparent material.

Clause 5

The laser sensor system according to clause 4, wherein the transparent material is an electro-optic material.

Clause 6

The laser sensor system according to clause 3, wherein the corrective lens is comprised of:

a material that changes an optical path length of the laser beam based on a thickness of the material; and sections in the corrective lens in which the material has thicknesses selected to compensate for changes in the optical path length of the laser beam in response to the laser beam passing through turbulent air and the sections.

Clause 7

The laser sensor system according to clause claim 6, wherein the thicknesses for the sections are based on an optical path length change caused by the turbulent air at the sections.

Clause 8

The laser sensor system according to clause claim 7, wherein a selected thickness for a selected section is greater than a base thickness such that optical path length is increased for the laser beam passing through the selected section as compared using the base thickness.

Clause 9

The laser sensor system according to clause 7, wherein a selected thickness for a selected section is less than a base thickness such that optical path length is decreased for the laser beam passing through the selected section as compared using the base thickness.

Clause 10

The laser sensor system according to clause 2, wherein the optically reflective element is one of a mirror, a deformable mirror, and array of micro-mirrors, and a microelectoral mechanical system mirror.

Clause 11

The laser sensor system according to one of clauses 1, 2, 3, 4, 5, 6, 7, 8, 9, or 10, wherein the corrective optical device comprises: corrective optical elements; and a positioning system configured to position a selected corrective optical element in the corrective optical elements in the path of the laser beam.

Clause 12

The laser sensor system according to clause 11, wherein the analyzer is configured to:

select the selected corrective optical element in the corrective optical elements in response to a power of interfered light not being greater a threshold; and control the positioning system to position the selected corrective optical element in the path of the laser beam.

Clause 13

The laser sensor system according to one of clauses 1, 2, 3, 4, 5, 6, 7, 8, 9, 10, 11, or 12, wherein the set of characteristics is selected from at least one of a beat frequency, a power, polarization, or wavelength, or an intensity.

Clause 14

The laser sensor system according to one of clauses 1, 2, 3, 4, 5, 6, 7, 8, 9, 10, 11, 12, or 13, wherein the set of parameters is selected from at least one of a speed, an angle of sideslip, an angle of attack, or an aerodynamic efficiency.

Clause 15

A corrective lens comprising:

a material that changes an optical path length of a laser beam based on a thickness of the material; and sections of the material in the corrective lens have thicknesses selected to compensate for changes in the optical path length of the laser beam in response to the laser beam passing through turbulent air and the sections.

Clause 16

The corrective lens according to clause 15, wherein the thicknesses for the sections are based on an optical path length change caused by the turbulent air at the sections.

Clause 17

The corrective lens according to clause 16, wherein the thickness of the material in a selected section is greater than a base thickness such that optical path length is increased for the laser beam passing through the selected section as compared using the base thickness.

Clause 18

The corrective lens according to clause 16, wherein the thickness of the material in a selected section is less than a base thickness such that optical path length is decreased for the laser beam passing through the selected section as compared using the base thickness.

Clause 19

The corrective lens according to clause 16, wherein the optical path length change is time averaged optical path difference.

Clause 20

A method for determining a set of parameters for an aircraft, the method comprising:

emitting a laser beam on a path;

directing the laser beam through a corrective optical device positioned in the path of the laser beam, wherein the corrective optical device reduces distortion from the laser beam from passing through a turbulent air;

interfering a backscatter light with a reference light to form an interfered light in response to receiving the backscatter light;

measuring a set of characteristics for the interfered light; and determining the set of parameters for the aircraft using the set of characteristics.

Clause 21

The method of according to clause 20, wherein the corrective optical device reduces changes in an optical path length for portions of the laser beam caused by the laser beam passing through the turbulent air.

Clause 22

The method according to one of clauses 20 or 21, wherein the corrective optical device comprises corrective optical elements and further comprising:

selecting a selected corrective optical element in the corrective optical elements in response to a power of the backscatter light not being greater than a threshold; and positioning the selected corrective optical element in the path of the laser beam.

Clause 23

The method according to one of clauses 20, 21, or 22, wherein the set of characteristics is selected from at least one of a beat frequency, a power, polarization, or wavelength, or an intensity.

Clause 24

The method according to one of clauses 20, 21, 22, or 23, wherein the set of parameters is selected from at least one of a speed, an angle of sideslip, an angle of attack, or an aerodynamic efficiency.

Clause 25

A method for correcting distortions in a laser beam, the method comprising:

determining optical path length changes to of portions a laser beam caused by a turbulent air across a path of the laser beam;

generating a corrective lens design that corrects for optical path length changes to the portions of the laser beam such that the optical path length changes to the portions of the laser beam are reduced; and manufacturing a corrective lens using the corrective lens design.

Clause 26

The method according to clause 25, wherein determining the optical path length changes to the portions of the laser beam caused by the turbulent air across the path of the laser beam comprises:

identifying optical path changes for a cross-section of the laser beam in the path through the turbulent air over a period of time; and averaging the optical path changes for the cross-section to form a time averaged optical path difference for sections of the cross-section.

Clause 27

The method according to one of clauses 25 or 26, wherein generating the corrective lens design that corrects for optical path length changes to the portions of the laser beam such that the optical path length changes to the portions of the laser beam are reduced comprises:

selecting thicknesses for lens sections of the corrective lens using a time averaged optical path difference, wherein changes in the optical path length of the laser beam passing through the lens sections have increased a uniformity in response to the laser beam passing through the turbulent air.

Clause 28

The method according to one of clauses 25, 26, or 27 further comprising:

emitting the laser beam through the corrective lens, wherein the optical path length changes to the portions of the laser beam caused by the turbulent air are reduced by the corrective lens.

Clause 29

An aerodynamic efficiency measurement system comprising:

a laser beam generator is configured to emit a laser beam on a path relative to a surface of an aircraft;

an interference system configured to interfere a backscatter light with a reference light to form an interfered light in response to receiving the backscatter light;

a detection system configured to measure a set of characteristics for the interfered light; and an efficiency analyzer configured to determine an aerodynamic efficiency for the aircraft using the set of characteristics for the interfered light for the interfered light.

Clause 30

The aerodynamic efficiency measurement system according to clause 29, where in determining the aerodynamic efficiency for the aircraft using set of characteristics measured for the interfered light for the interfered light, the efficiency analyzer is configured to:

compare a power of the interfered light to a set of thresholds corresponding to aerodynamic efficiency for the aircraft to form a comparison; and determining the aerodynamic efficiency for the aircraft based on the comparison.

Clause 31

A method for determining an aerodynamic efficiency for an aircraft, the method comprising:

emitting a laser beam on a path relative to a surface of the aircraft;

interfering a backscatter light received in response emitting the laser beam with a reference beam to generate an interfered light;

measuring a power of interfered light; and determining an aerodynamic efficiency for the aircraft using power measured for the interfered light.

Clause 32

The method according to clause 31, determining the aerodynamic efficiency for the aircraft using the interfered light comprises:

comparing the power of the interfered light to a set of thresholds corresponding to aerodynamic efficiency for the aircraft to form a comparison; and determining the aerodynamic efficiency for the aircraft based on the comparison.

Thus, the illustrative embodiments provide a method, apparatus, and system for determining parameters for an aircraft using a laser system in the form of laser sensor system that corrects for turbulent air. In one illustrative example, a laser sensor system comprises a laser beam generator, a corrective optical device, an interference system, a detection system, and an analyzer. The laser beam generator is configured to emit a laser beam on a path from an aircraft. The corrective optical device is positioned in the path of the laser beam. The corrective optical device reduces distortion from the laser beam from passing through a turbulent air. The interference system is configured to interfere a backscatter light with a reference light to form an interfered light having a power in response to receiving the backscatter light. The detection system is configured to measure a set of characteristics for the interfered light. The analyzer is configured to determine a set of parameters for the aircraft using the set of characteristics.

With one or more illustrative examples, increase performance in determining parameters such as speed, angle of sideslip, angle of attack, aerodynamic efficiency, aerosol concentration, or other parameters can be detected using a laser system in the form of a laser sensor system on an aircraft. The use of the corrective lens with this laser system can correct for distortions of the coherent light in a laser beam caused by turbulent air in the path of a laser beam. As a result, the use of the corrective lens can reduce or cancel issues caused by these adverse effects turbulent airflow by increasing the uniformity of the coherent light in the laser beam.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms “includes”, “including”, “has”, “contains”, and variants thereof are used herein, such terms are intended to be inclusive in a manner similar to the term “comprises” as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A laser sensor system comprising:

a laser beam generator configured to emit a laser beam on a path from an aircraft;

a corrective optical lens positioned in the path of the laser beam, wherein the corrective lens includes multiple sections having varying thicknesses relative to optical path differences through the sections, wherein the corrective optical lens reduces distortion from the laser beam from passing through a turbulent air;

an interference system configured to interfere a backscatter light with a reference light to form an interfered light having a power in response to receiving the backscatter light;

a detection system configured to measure a set of characteristics for the interfered light; and an analyzer configured to determine a set of parameters for the aircraft using the set of characteristics.

2. The laser sensor system of claim 1, wherein the corrective lens is comprised of a transparent material.

3. The laser sensor system of claim 1, wherein the corrective lens is comprised of:

a material that changes an optical path length of the laser beam based on a thickness of the material; and the sections in the corrective lens in which the material has thicknesses selected to compensate for changes in the optical path length of the laser beam in response to the laser beam passing through the turbulent air and the sections.

4. The laser sensor system of claim 3, wherein the thicknesses for the sections are based on an optical path length change caused by the turbulent air at the sections.

5. The laser sensor system of claim 4, wherein a selected thickness for a selected section is greater than a base thickness such that the optical path length is increased for the laser beam passing through the selected section as compared using the base thickness.

6. The laser sensor system of claim 4, wherein a selected thickness for a selected section is less than a base thickness such that the optical path length is decreased for the laser beam passing through the selected section as compared using the base thickness.

7. The laser sensor system of claim 1, wherein the set of characteristics is selected from at least one of a beat frequency, a power, polarization, or wavelength, or an intensity.

8. The laser sensor system of claim 1, wherein the set of parameters is selected from at least one of a speed, an angle of sideslip, an angle of attack, or an aerodynamic efficiency.

9. A method for determining a set of parameters for an aircraft, the method comprising:

emitting a laser beam on a path;

directing the laser beam through a corrective optical lens positioned in the path of the laser beam, wherein the corrective optical lens includes multiple sections having varying thickness relative to optical path differences through the sections, wherein the corrective optical lens reduces distortion from the laser beam from passing through turbulent air;

interfering a backscatter light with a reference light to form an interfered light in response to receiving the backscatter light;

measuring a set of characteristics for the interfered light; and determining the set of parameters for the aircraft using the set of characteristics.

10. The method of claim 9, wherein the corrective optical lens reduces changes in an optical path length for portions of the laser beam caused by the laser beam passing through the turbulent air.

11. The method of claim 9, wherein the set of characteristics is selected from at least one of a beat frequency, a power, polarization, or wavelength, or an intensity.

12. The method of claim 9, wherein the set of parameters is selected from at least one of a speed, an angle of sideslip, an angle of attack, or an aerodynamic efficiency.

13. The method of claim 9, wherein the corrective lens is comprised of a transparent material.

14. The method of claim 9, wherein the corrective lens is comprised of:

a material that changes an optical path length of the laser beam based on a thickness of the material; and the sections in the corrective lens in which the material has thicknesses selected to compensate for changes in the optical path length of the laser beam in response to the laser beam passing through the turbulent air and the sections.

15. The method of claim 14, wherein the thicknesses for the sections are based on an optical path length change caused by the turbulent air at the sections.

16. The method of claim 14, wherein a selected thickness for a selected section is greater than a base thickness such that the optical path length is increased for the laser beam passing through the selected section as compared using the base thickness.

17. The method of claim 14, wherein a selected thickness for a selected section is less than a base thickness such that the optical path length is decreased for the laser beam passing through the selected section as compared using the base thickness.

* * * * *